US006332116B1

(12) United States Patent
Qian et al.

(10) Patent No.: US 6,332,116 B1
(45) Date of Patent: Dec. 18, 2001

(54) SYSTEM AND METHOD FOR ANALYZING SIGNALS OF ROTATING MACHINES

(75) Inventors: Shie Qian, Austin, TX (US); Hui Shao, Shanghai (CN)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 09/551,924

(22) Filed: Apr. 19, 2000

(51) Int. Cl.[7] ..................................................... G01F 1/56

(52) U.S. Cl. ........................... 702/183; 702/182; 702/76; 702/147; 73/660; 340/683

(58) Field of Search ..................................... 702/182, 183, 702/76, 147; 73/659, 660, 579, 583, 593, 609, 559; 340/681, 682, 683; 324/207, 25, 226; 708/400

(56) References Cited

U.S. PATENT DOCUMENTS

| | | | |
|---|---|---|---|
| H1720 | * 4/1998 | Chen | 342/25 |
| H1726 | * 5/1998 | Chen | 342/93 |
| 4,599,567 | * 7/1986 | Goupillaud et al. | 324/77 G |
| 4,912,661 | 3/1990 | Potter . | |
| 5,353,233 | 10/1994 | Qian et al. . | |
| 5,365,787 | 11/1994 | Hernandez et al. . | |
| 5,473,555 | * 12/1995 | Potter | 364/724.1 |
| 5,486,833 | * 1/1996 | Barrett | 342/204 |
| 5,594,175 | * 1/1997 | Lyon et al. | 73/593 |
| 5,729,694 | * 3/1998 | Holzrichter et al. | 395/2.17 |
| 5,784,273 | * 7/1998 | Madhaven | 364/176 |
| 5,852,567 | 12/1998 | Xia et al. . | |
| 5,903,819 | * 5/1999 | Romesburg | 455/63 |
| 5,995,910 | * 11/1999 | Discenzo | 702/56 |
| 6,041,287 | * 3/2000 | Dister et al. | 702/182 |
| 6,057,924 | * 5/2000 | Ross et al. | 356/381 |
| 6,131,013 | * 10/2000 | Bergstrom et al. | 455/63 |

OTHER PUBLICATIONS

"Order Analysis," Realtime Update, Fall 1996–Winter 1997, Hewlett–Packard, p. 1.

Technical Review No. 1—1999, ©Brüel & Kjaer Sound & Vibration Measurement A/S, "Characteristics of the Vold–Kalman Order Tracking Filter by S. Gade et al.," pp. 1–59.

Herlufsen et al., "Characteristics of the Vold/Kalman Order Tracking Filter," Sound & Vibration, Apr. 1999, pp. 2–8.

(List continued on next page.)

*Primary Examiner*—Marc S. Hoff
*Assistant Examiner*—Carol S. Tsai
(74) *Attorney, Agent, or Firm*—Conley, Rose & Tayon PC; Jeffrey C. Hood

(57) ABSTRACT

A signal analysis system and method for analyzing an input signal acquired from a mechanical system. The mechanical system may include at least one rotating apparatus. The signal analysis system may be configured to: (a) receive samples of the input signal, (b) perform an invertible joint time-frequency transform (e.g. a Gabor transform) on the samples of the input signal to produce a first array of coefficients which depend on time and frequency, (c) select first coefficients from the first array which correspond to a first subset of one or more order components in the input signal, (d) generate a time domain signal from the first coefficients, and (e) present the time domain signal to a user on a presentation device. The signal analysis system generate the time domain signal from the first coefficients by performing an inverse joint time-frequency transform on the first coefficients. The signal analysis system extract the one or more order components for presentation to the user by masking out all coefficients except those corresponding to the one or more components. Conversely, the signal analysis system may suppress the one or more order components, i.e. present to the user the input signal minus the one or more order components by masking out coefficients corresponding to the one or more components and keeping the remaining coefficients.

47 Claims, 13 Drawing Sheets

OTHER PUBLICATIONS

Vold et al., "Multi Axle Order Tracking with the Vold/Kalman Tracking Filter," Sound & Vibration, May 1997, pp. 30–34.

Gade et al., "Order Tracking Analysis," 1995, 47 pages.

Product Data, Vold–Kalman Order Tracking Filter, 1998, pp. 1–7.

Product Data, Order Tracking Analyzer, 1995, pp. 1–7.

"Effective Machinery Measurements using Dynamic Signal Analyzers," Hewlett–Packard Co. 1997, pp. 3–84.

Roush Industries, Inc. "Noise and Vibration Training Course for Test Engineers and Technicians", May 1999.

* cited by examiner

SYSTEM AND METHOD FOR ANALYZING SIGNALS OF ROTATING MACHINES

FIELD OF THE INVENTION

The invention relates generally to signal analysis or test and measurement systems, and more particularly to a system and method for analyzing order components of a signal generated by a physical system (e.g., a mechanical system containing one or more rotating elements).

DESCRIPTION OF THE RELATED ART

Scientists and engineers often use test and measurement and data acquisition systems to perform a variety of functions, including laboratory research, process monitoring and control, data logging, analytical chemistry, test and analysis of physical phenomena and analysis or control of mechanical or electrical machinery, to name a few examples. One example of hardware to implement such measuring systems is a computer-based measurement system or data acquisition (DAQ) system. Another example of a measurement system is a dedicated instrument, such as a dedicated oscilloscope or signal analyzer.

A measurement system typically may include transducers for measuring and/or providing electrical signals, signal conditioning hardware which may perform amplification, isolation and/or filtering, and measurement or DAQ hardware for receiving digital and analog signals and providing them to a processing system, such as a processor or personal computer. The computer-based measurement system or dedicated instrument may further include analysis hardware and software for analyzing and appropriately displaying the measured data.

One example where measurement and data acquisition systems are used is in the field of rotating machinery analysis. This involves the analysis of physical signals such as vibration or acoustic signals from a rotating machine. A physical signal acquired from a rotating machine may be sampled or digitized. Typically, samples of the physical signal are equidistant in time. However, rotating machines generate signals which are periodic with respect to shaft rotation, i.e., rotation angle of an underlying rotating element (e.g. a crank shaft of an engine). These rotation periodic signals are referred to herein as order components. When the rotation rate changes in time, the order components change correspondingly in frequency. For example, when the rotation rate increases, the order components increase in frequency. Thus, a traditional analysis method such as the Discrete Fourier Transform (DFT), when applied to the physical signal, displays a frequency-smearing of order components. The frequency smearing makes it very difficult to derive meaningful information about to the order components. Thus, traditional signal analysis methods such as the Fourier Transform of the time domain input signal are not well suited for analyzing order components generated by rotating machines.

In order to better analyze the performance and characteristics of rotating machines, certain prior art systems convert the time-samples, i.e., the samples of the physical signal which are equally space in time, to angle-samples, i.e. samples of the physical signal which are equally spaced in shaft angle. For example, U.S. Pat. No. 4,912,661 assigned to Hewlett-Packard discloses an interpolation method for estimating angle-samples from time-samples. The method disclosed in U.S. Pat. No. 4,912,661 performs an interpolation of the time domain signal, followed by a decimation, in order to produce samples equally spaced with respect to shaft angle. The order components may then be analyzed by performing a traditional analysis method such as the Discrete Fourier Transform on the angle-samples. However, this method is expensive in terms of computational resources and may not be very accurate.

One prior art system known as the Vold-Kalman filter, developed by Bruel and Kjaer, allows the user to track the frequency of an order component given a sufficiently accurate model, i.e., a stochastic model, for the physical signal. The Vold-Kalman filter performance may be strongly sensitive to model accuracy. In other words, the tracking performance is likely to be degraded when an inaccurate signal model is supplied to the filter.

Therefore, there exists a need for a system and method which could more accurately and robustly analyze order components of a physical signal, and reconstruct desired order components in the time-domain.

SUMMARY OF THE INVENTION

One embodiment of the present invention comprises a signal analysis system (or measurement system) and method for analyzing an input signal acquired from a physical or mechanical system. The mechanical system may include at least one rotating apparatus. The signal analysis system may be configured to: (a) receive samples of the input signal, (b) perform an invertible joint time-frequency transform (e.g., a Gabor transform) on the samples of the input signal to produce an array of coefficients which depend on time and frequency, (c) select first coefficients from the array which correspond to a first subset of one or more order components of interest in the input signal, (d) generate a time domain signal from the first coefficients, e.g., by performing an inverse joint time-frequency transform on the first coefficients, and (e) present the time domain signal to a user on a presentation device.

The input signal is preferably a time domain input signal, i.e., the samples are sampled in time, preferably uniformly in time. The invertible joint time-frequency transform operates to transform the samples of the input signal to produce an array of coefficients which depend on time and frequency. The joint time-frequency transform is invertible, meaning that an inverse transform may be applied to the array of time-frequency coefficients to reproduce the original (or approximately the original) time domain input signal. The invertible joint time-frequency transform is preferably the Gabor transform, but may instead be a wavelet transform, or the Gabor spectrogram.

The input signal may comprise a plurality of order components. According to various embodiments of the invention, various order components of the input signal may be selectively extracted (or removed) from the array of time-frequency coefficients (the joint time-frequency representation), and then the inverse joint time-frequency transform may be applied to produce a time domain signal containing only the selected order components (or produce the original input signal minus the removed order components).

The first subset of order components which the user desires to analyze may be selected in order to select the first coefficients from the array. For example, the user may directly select the one or more order components which the user desires to analyze, and the coefficients corresponding to these selected order components may then be used to generate the time domain signal. Alternatively, a second subset of order components in the input signal may be selected for masking or removal, wherein the remaining order components are the first subset of order components desired to be analyzed by the user. Thus the first subset of order components may correspond to order components of the input signal which are not included in the second subset of one or more order components. Thus the first subset of order components may be "selected" by selecting non-members of this first subset for masking or removal.

Various methods may be used in selecting the order components of interest. For example, the signal analysis system may display a visual representation of the array of coefficients, wherein the various order components are visible in the visual representation as time-frequency curves. The user may select one or more points in the visual representation to select one or more order components. For example, the user may position a "cross-hairs" on the selected order components in the visual representation. The signal analysis system may then determine one or more time-frequency curves corresponding to the selected points, wherein the determined time-frequency curves correspond to the selected order components. The signal analysis system may select the first coefficients of the array as those coefficients which reside in a union of time-frequency neighborhoods containing the one or more determined time-frequency curves respectively. Alternatively, where the user (or the system) selects one or more order components for removal, the signal analysis system may select the first coefficients of the array as those coefficients which reside in the complement of the union of neighborhoods containing the selected time-frequency curves.

The size of each neighborhood may be determined automatically or in response to user input. For example, the signal analysis system may automatically determine a size for the time-frequency neighborhood based on an estimate of minimum order distance to nearest neighbor order components.

The signal analysis system may select the first coefficients from the array by constructing an order mask array, and applying the order mask array to the array of coefficients. The signal analysis system may determine one or more time-frequency curves which correspond to the desired first subset of order components, and construct the order mask array by setting coefficients of the order mask array equal to one in a union of neighborhoods containing the one or more time-frequency curves respectively, and zero elsewhere. Conversely, in order to select the first subset of order components, the signal analysis system may determine one or more time-frequency curves which correspond to a second subset of one or more order components. The signal analysis system may set coefficients of the order mask array equal to zero in a union of neighborhoods containing the one or more time-frequency curves of the second subset respectively. The first subset of order components comprises order components of the input signal which are not included in the second subset.

The signal analysis system may construct the order mask by computing an instantaneous rotation frequency signal with respect to time. The instantaneous rotation frequency signal corresponds to a fundamental order component of the input signal. The order mask array may be constructed using one or more multiples of the instantaneous rotation frequency signal. The signal analysis system may receive a rotation indicator signal indicative of speed of rotation of the rotating apparatus, and the instantaneous rotation frequency signal may be computed in response to the rotation indicator signal. Alternatively, the signal analysis system or the user may estimate the instantaneous rotation frequency, thus obviating the necessity of acquiring the rotation indicator signal.

In one embodiment, the signal analysis system is configured to emphasize and/or de-emphasize order components by multiplying the joint time-frequency transform coefficients, i.e., the first array of coefficients, with an arbitrary scaling function. The user may determine the scaling properties of the scaling function. The resultant coefficient array, i.e. after the multiplication may be inverse transformed to generate a time-domain signal. The time-domain signal may then be presented to the user through signal presentation device(s).

The user may select various different order components for analysis, e.g., in an iterative fashion. Time domain signals generated in response to the selected order components may be visually displayed and/or audially presented to the user. The user may then analyze the different order components to determine information regarding operation of the mechanical system. In response to this analysis, the user may then adjust the mechanical system in various ways. For example, the user or the system may change a design of the mechanical system, the user may replace one or more components of the mechanical system, the user or the system may predict a failure of one or more components of the mechanical system, or the user may add varying amounts of a sound-absorbent material to one or more locations of the mechanical system, etc.

BRIEF DESCRIPTION OF THE DRAWINGS

A better understanding of the present invention can be obtained when the following detailed description of the preferred embodiment is considered in conjunction with the following drawings, in which.

Figure 1A:
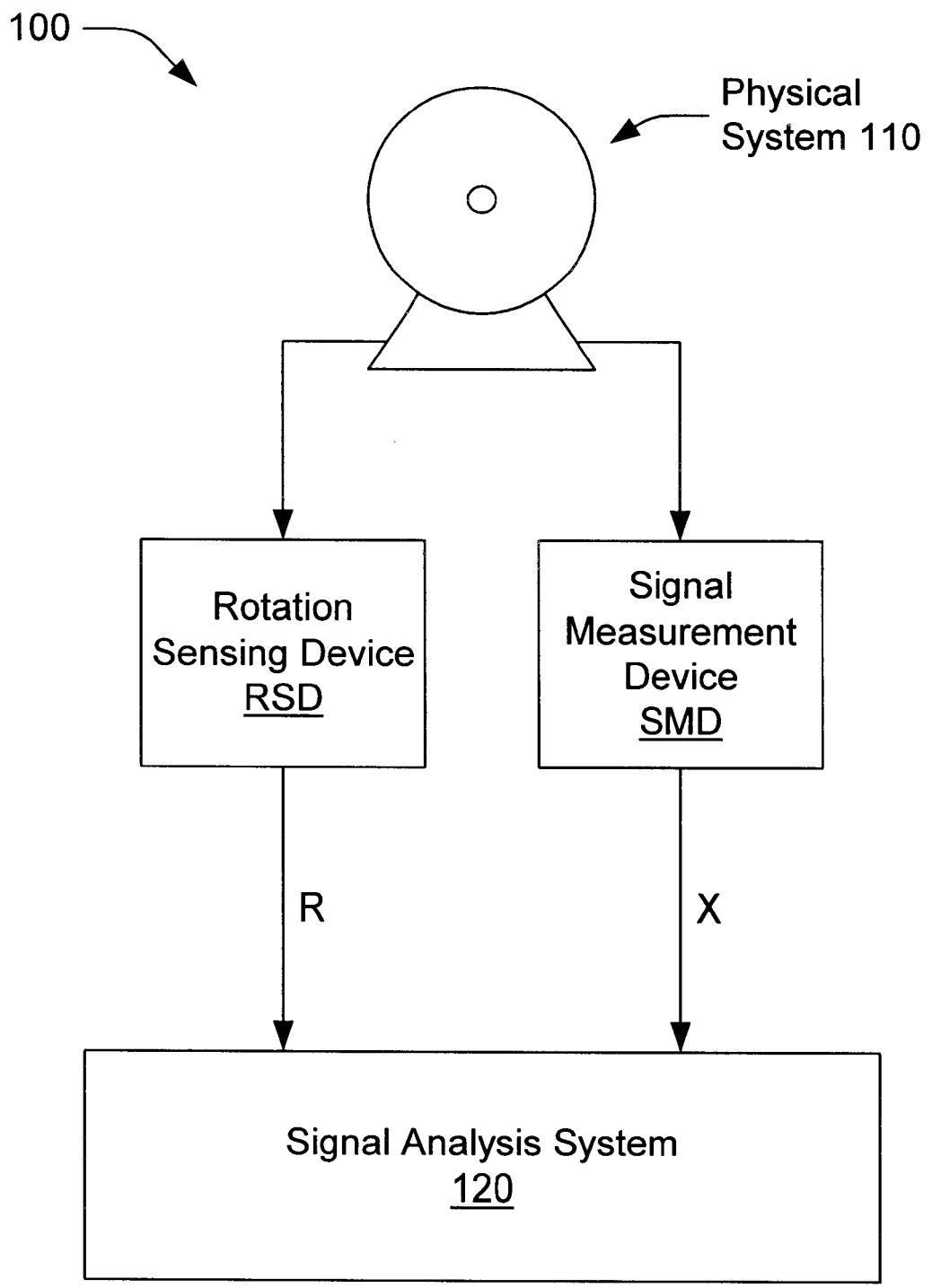
FIG. 1A illustrates a system configuration 100 for analyzing physical signals acquired from a mechanical system comprising one or more rotating elements.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporation by Reference

U.S. Pat. No. 5,353,233 titled "Method and Apparatus for Time Varying Spectrum Analysis" whose inventors are Shie Qian and Dapang Chen, which was issued on Oct. 4, 1994, is hereby incorporated by reference as though fully and completely set forth herein.

U.S. Pat. No. 5,852,567 titled "Iterative Time-Frequency Domain Transform Method for Filtering Time-Varying, Nonstationary Wide Band Signals in Noise", whose inventors are Xiang-Gen Xia and Shie Qian, which was issued on Dec. 22, 1998, is hereby incorporated by reference as though fully and completely set forth herein.

*Joint Time-Frequency Analysis—Methods and Applications* by Shie Qian and Dapang Chen, published by Prentice-Hall, ISBN 0-13-254384-2, is hereby incorporated by reference as though fully and completely set forth herein.

FIG. 1A

FIG. 1A illustrates a system configuration 100 for performing signal analysis. System configuration 100 may comprise a physical system 110 to be analyzed, a rotation sensing device RSD, a signal measurement device SMD and a signal analysis system 120, which may also be referred to as a measurement system. Physical system 110 may be a mechanical system which contains one or more rotating elements. For example, physical system 110 may be an automobile engine, an aircraft engine, a turbine, a disk drive, a tape drive, a fan motor, a boat propeller, or any other machine or device having a rotating element.

Signal measurement device SMD is preferably placed proximate to (e.g., on or close to) the physical system 110. Signal measurement device SMD may measure a physical signal generated by physical system 110 and transduce the physical signal into a corresponding electrical signal X. Signal measurement device SMD may present the electrical signal X to signal analysis system 120 in analog or digital form. Thus, in one embodiment, signal measurement device SMD includes analog-to-digital conversion hardware. In a second embodiment, digital-to-analog conversion hardware is comprised within signal analysis system 120. Signal measurement device SMD may be any of a variety of measurement devices such as a microphone, an accelerometer, a spatial displacement sensor, a strain gauge, a pressure sensor, a temperature sensor (e.g., a thermocouple), a radiation sensor, an optical sensor, etc. In one embodiment, signal measurement device SMD may represent an array of transducers or measurement devices of one or more types. For example, an array of microphones may be distributed at various locations in an engine to acquire audio signals from the engine.

Figure 2A:
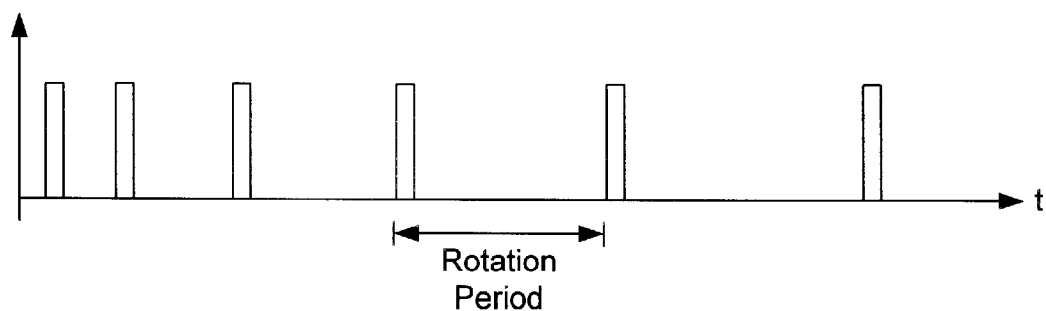
FIGS. 2A and 2B illustrate signals generated by typical tachometers.
Figure 2B:
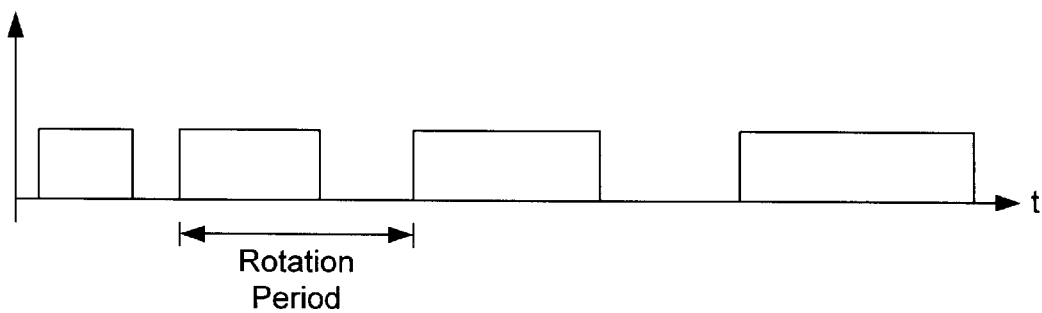

Rotation sensing device RSD may detect rotations of a rotating element in the physical system 100, and may present a rotation indicator signal R to signal analysis system 120. Thus, rotation sensing device RSD may generate a rotation indicator signal R which is indicative of the speed of rotation of the rotating element in physical system 110. In one embodiment, rotation sensing device RSD may comprise a tachometer which generates an electrical pulse for each rotation of the rotating element. FIG. 2A presents one example of tachometer signal. FIG. 2B presents a second example of a tachometer signal. Rotation sensing device RSD may present the rotation indicator signal R to signal analysis system 120 in analog or digital form.

Figure 1B:
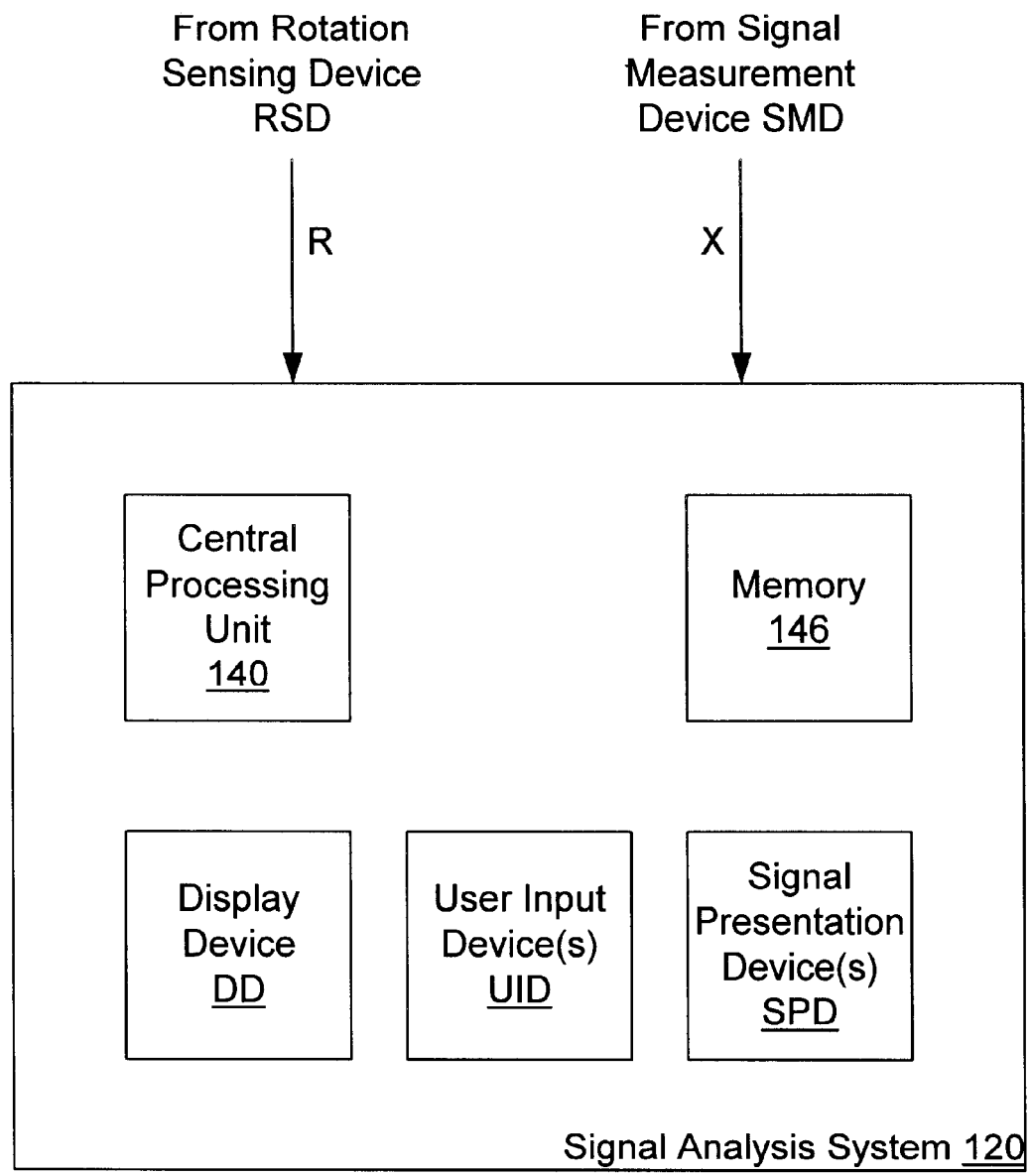
FIG. 1B illustrate one embodiment for a signal analysis system 120.

Signal analysis system 120 may couple to signal measurement device SMD, and rotation sensing device RSD. Signal analysis system 120 may be configured for analyzing one or more order components of a signal generated by or acquired from physical system 110. Signal analysis system 120 may comprise a processor or central processing unit 140, memory medium 146, signal presentation device(s) SPD, user input device(s) UID and a display device DD as shown in FIG. 1B. CPU 140 may be realized by any of a variety of computational devices such as a general purpose processor, a digital signal processor, a parallel processor, dedicated digital and/or analog circuitry, programmable gate array logic (e.g., an FPGA), etc., or any combination thereof. Memory medium 146 may comprise any of a variety of memory devices such as random access memory (RAM) and/or read-only memory (ROM), as described further below. Signal analysis system 120 may also include specialized data acquisition and/or signal conditioning hardware, interface hardware, etc., or any combination thereof.

Signal analysis system 120 may comprise any of various devices, such as a programmable computer system, a computer-based system such as a VXI-based system, PXI-based system, a GPIB-based system, a computer-based data acquisition system, or a dedicated test instrument, such as a dynamic signal analyzer, an oscilloscope or any other signal acquisition and/or analysis device.

Signal analysis system 120 may operate on samples of the electrical signal X generated by signal measurement device SMD and on the rotation indicator signal R, optionally in response to user input(s) provided through user input device(s) UID, and generate an output signal Y. The output signal Y (or a representation thereof) may be presented to the user through signal presentation device(s) SPD.

Signal presentation device(s) SPD may comprise one or more speakers, a display screen (which may be identical to or distinct from display device DD), a projector, a tactile output device, a virtual reality headset, etc., or other types of output devices, or any combination thereof. In one embodiment, signal analysis system 120 may present the output signal Y to a speaker, and the signal analysis system 120 may also present a graphical depiction of the output signal Y to the display screen. The acoustic or audial presentation (through the speaker) may be especially meaningful in situations where the original physical signal measured by signal measuring device SMD is an acoustic signal, e.g., engine noise.

User input device(s) UID may comprise a keyboard, a pointing device such as a mouse or trackball, a touch pad (such as those used in modern laptop computers for cursor control), a touch sensitive display screen, etc., or other input devices. In one embodiment, user input device(s) UID may include use of a graphical control panel configured with various controls such as buttons, knobs, sliders, switches, indicators, etc., or any combination thereof. A user provides input to signal analysis system 120 through user input device(s). Signal analysis system 120 may manage a graphical user interface through display device DD and user input device(s) UID.

Figure 3A:
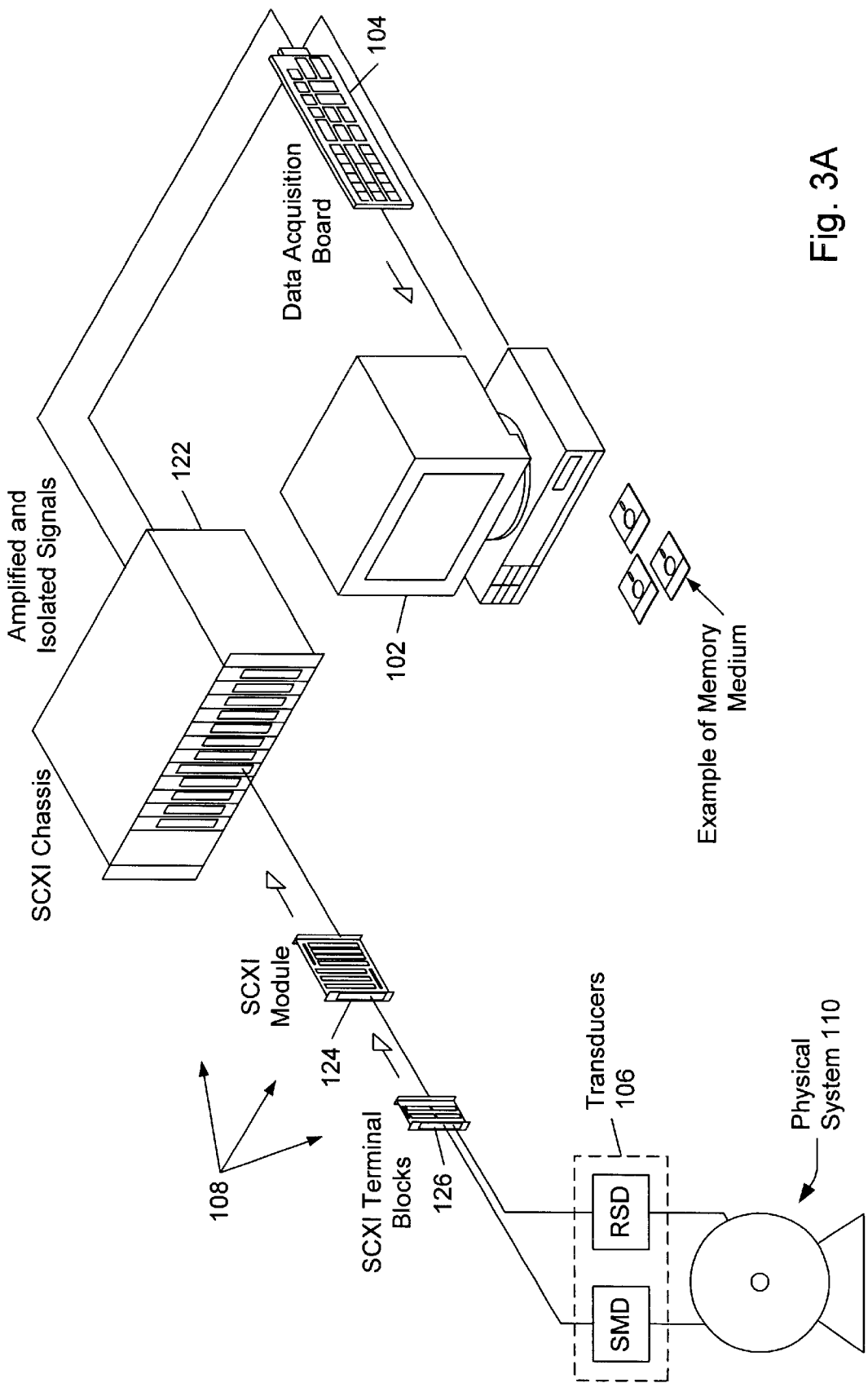
FIG. 3A illustrates one embodiment of signal analysis system 120 comprising a computer-based measurement system, where signals generated by signal measurement device SMD and rotation sensing device RSD are presented to computer 102 through signal conditioning system 108 and data acquisition (DAQ) device 104.
Figure 3B:
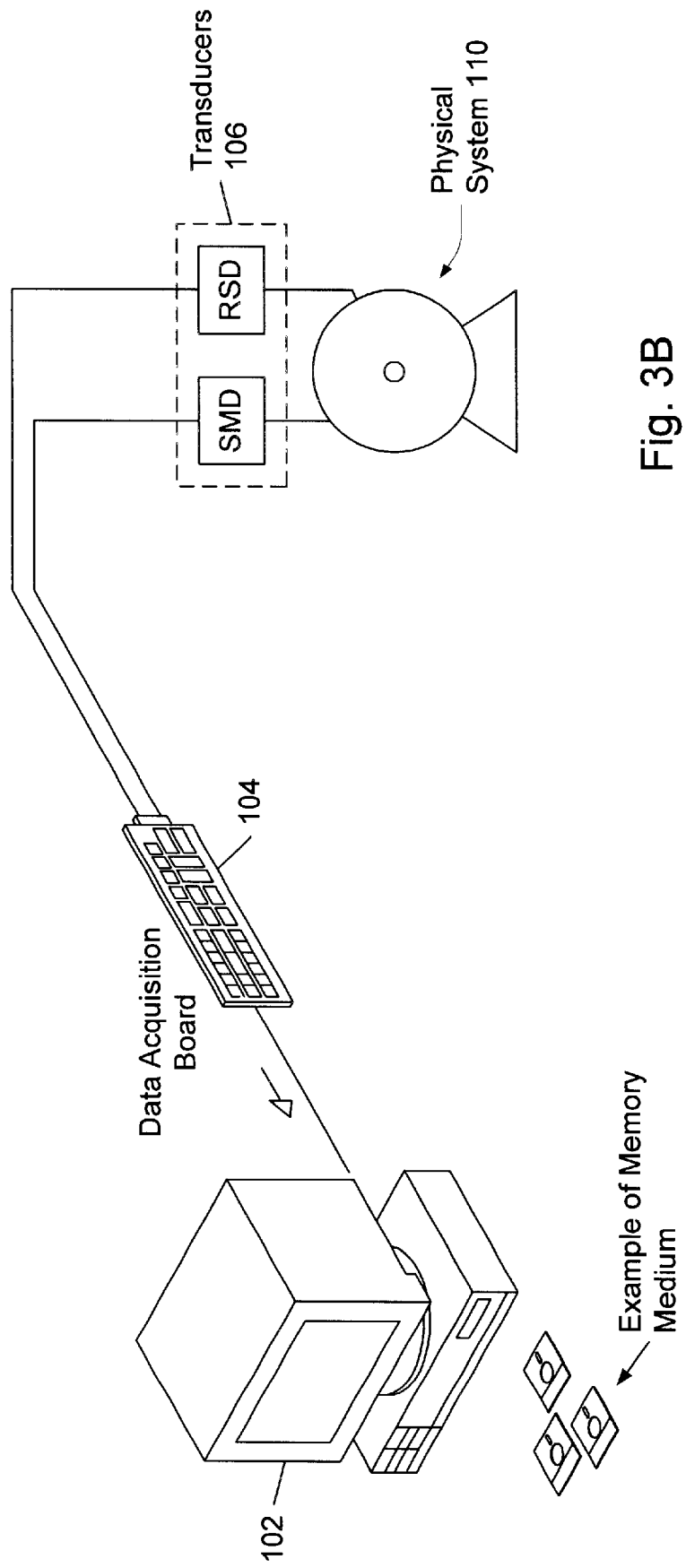
FIG. 3B illustrates a second embodiment of signal analysis system 120 comprising a computer-based measurement system, where signals generated by signal measurement device SMD and rotation sensing device RSD are presented to computer system 102 through data acquisition (DAQ) device 104.

FIGS. 3A and 3B

FIGS. 3A and 3B illustrates exemplary embodiments of signal analysis system 120. As shown, signal analysis system 120 may comprise a computer 102, a data acquisition (DAQ) device 104 coupled to the computer 102, and optionally a signal conditioning system 108 coupled to the DAQ device 104. Signal measurement device SMD and rotation sensing device RSD may comprise transducers 106 that couple to DAQ device 104 through the signal conditioning circuitry 108. As shown, the transducers 106, e.g., signal measurement device SMD and rotation sensing device RSD, may couple to physical system 110 to acquire signals from physical system 110.

As shown, the transducers SMD and RSD are coupled to acquire signals from the physical system 110. The signals X and R generated by the transducers SMD and RSD respectively may be optionally conditioned by the signal conditioning system 108 as shown in FIG. 3A. The conditioned signals may then be provided to DAQ device 104 as shown. Signal conditioning system 108 may connect to DAQ device 104 via one or more cables.

Signal conditioning system 108 may comprise an external chassis 122 housing one or more signal conditioning modules 124 and optionally terminal blocks 126. Signal conditioning system 108 may be used to perform signal conditioning on field signals such as the signals generated by rotation sensing device RSD and signal measurement device SMD. As used herein, the term "signal conditioning" may include one or more of amplifying, linearizing, isolating, filtering, switching and/or multiplexing field signals (e.g. transducer excitation), among other signal processing functions. Signal conditioning system 108 may advantageously reduce the introduction of noise into the signals transmitted to DAQ device 104. DAQ device 104 may receive conditioned field signal from signal conditioning system 108 as shown in FIG. 3A. Alternatively, DAQ device 104 may directly receive the field signals from transducers 106, e.g., signal measurement device SMD and rotation sensing device RSD. DAQ device 104 operates to perform analog to digital (A/D) conversion and provides the resultant digital signals to computer 102 for processing.

Computer system 102 may include various standard components, including a processor or central processing unit (CPU) 140, system memory 146, non-volatile memory, one or more buses, and a power supply. DAQ device 104 may be a specialized system for acquiring digital and/or analog signals from external devices. Thus, DAQ device 104 may include analog to digital (A/D) conversion circuitry and digital to analog (D/A) conversion circuitry. Examples of the DAQ device 104 include "E series" DAQ boards from National Instruments Corporation. DAQ device 104 may also comprise a computer-based instrument board, such as an oscilloscope, a digital multimeter (DMM), a dynamic signal analyzer, an arbitrary waveform generator, etc. DAQ device 104 may comprise hardware for detecting and storing the time of arrival of tachometer pulses.

In one embodiment, computer 102 may comprise input/output (I/O) slots into which DAQ device 104 may be coupled. In another embodiment, computer 102 may comprise a VXI (VME Extensions for Instrumentation) chassis and bus, a GPIB (General Purpose Interface Bus) interface card, a serial port or parallel port by which DAQ device 104 may be coupled to the computer 102.

Signal analysis system 120, e.g., computer system 102, preferably includes at least one memory medium on which computer programs according to the present invention may be stored. The term "memory medium" is intended to include various types of memory or storage, including an installation medium, e.g., a CD-ROM, or floppy disks 104, a computer system memory or random access memory such as DRAM, SRAM, EDO RAM, Rambus RAM, EPROM, EEPROM etc., or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network. In the latter instance, the second computer may provide the program instructions to the first computer for execution. Also, the computer system 102 may take various forms, including a personal computer system, mainframe computer system, workstation, network appliance, Internet appliance, personal digital assistant (PDA), television system, dedicated test or measurement instrument or other device. In general, the term "computer system" can be broadly defined to encompass any system having a processor which executes instructions from a memory medium.

The memory medium preferably stores a software program for analyzing signals acquired from a rotating machine. More particularly, the software program may be operable to analyze signals acquired or sampled at uniform time intervals and generate order data or order information useful in analyzing the operation of physical system 110.

The software program may be implemented in any of various ways, including procedure-based techniques, component-based techniques, object-oriented techniques, or neural net based learning techniques, among others. For example, the software program may be implemented using ActiveX controls, C++ objects, Java objects, Microsoft Foundation Classes (MFC), or other technologies or methodologies, as desired. A CPU, such as the host CPU, executing code and data from the memory medium comprises a means for performing signal analysis on signals acquired from a rotating machine according to the methods or flowcharts described below.

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as networks and/or a wireless link.

Figure 4:
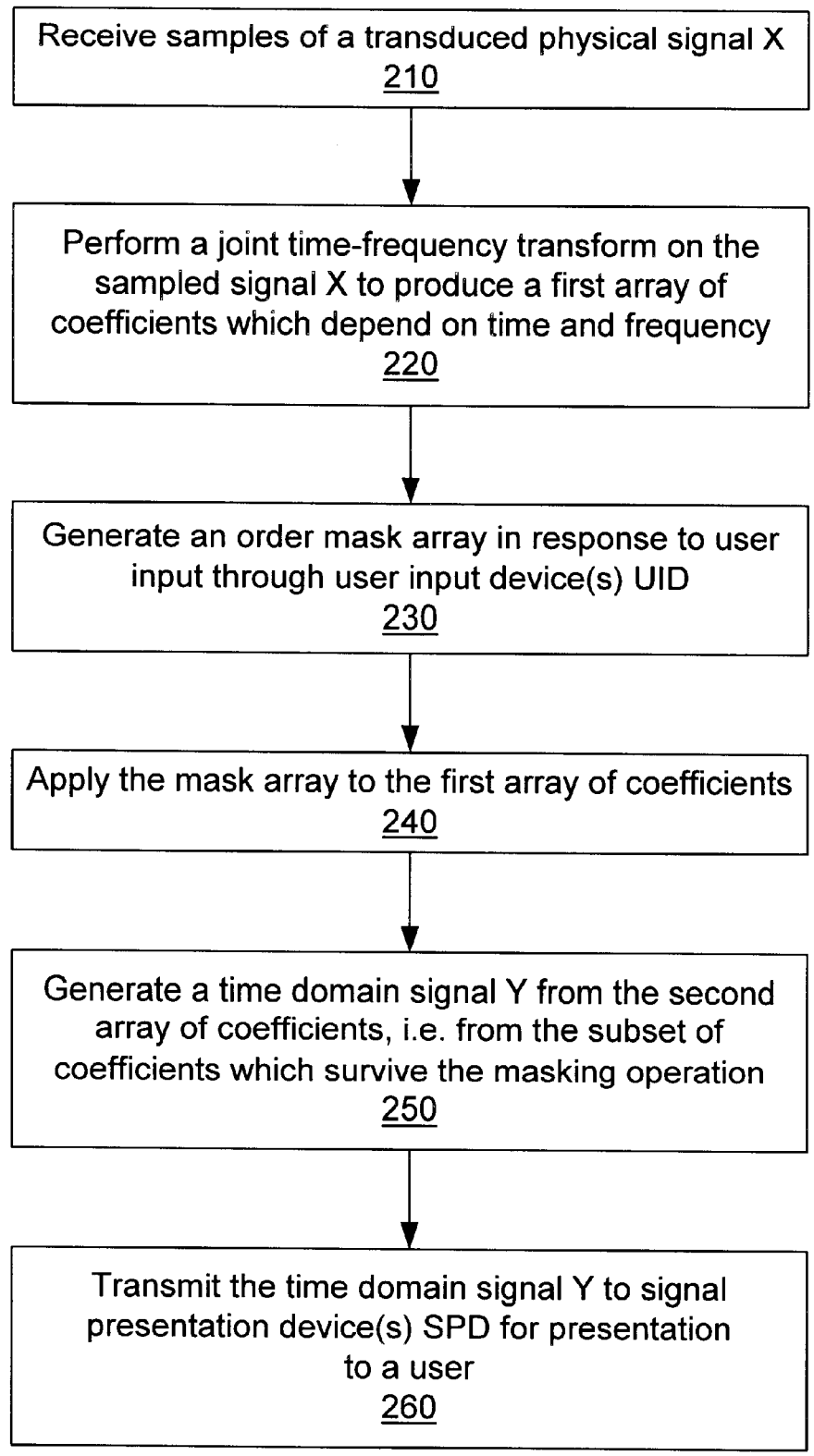
FIG. 4 presents a flowchart for one embodiment of an order analysis method.

FIG. 4—Flowchart Diagram

FIG. 4 illustrates one embodiment of a method for analyzing order components present in the physical signal acquired from physical system 110. For example, the method of FIG. 4 may be implemented by execution of the computer programs stored on the memory median as described above.

In step 210, signal analysis system 120 receives samples of the transduced physical signal X. These samples are preferably generated with a fixed time interval between successive samples. In other words, the samples may be equally space in time. Thus the signal measurement device SMD may acquire signals from the physical system 110 and provide these signals to the signal analysis system 120.

In step 220, signal analysis system 120 may perform an invertible joint time-frequency transform on the sampled signal X to produce a first array of coefficients (an array of joint time-frequency coefficients) which depend on time and frequency. The joint time-frequency transform is preferably invertible, meaning that, after the joint time-frequency transform is applied, resulting in a joint time-frequency representation (the first array of coefficients), an inverse joint time-frequency transform may be applied to the first array of coefficients to reproduce the original time domain signal, or a reasonable approximation of the original time domain signal.

In the method described herein, one or more order components may be selected for analysis from the joint time-frequency representation (the first array of coefficients). After selection of the one or more order components for analysis, the coefficients of these selected order components (not including coefficients corresponding to the non-selected order components) may be converted back into a time domain signal. This resulting time domain signal thus contains information only on the selected order components, thus providing information on these order components in the input signal.

In one embodiment, the joint time-frequency transform is the Gabor transform. For more information on the Gabor transform, see Qian and Chen, Joint Time-Frequency Analysis, referenced above. Other joint time-frequency transforms are also contemplated. In one alternative embodiment, the joint-time frequency transform may be a wavelet transform. In another embodiment, the joint-time frequency transform may be the Gabor spectrogram which is described in U.S. Pat. No. 5,353,233, incorporated by reference above. This embodiment using the Gabor spectrogram may be less preferred, since the Gabor spectrogram is not completely invertible.

Figure 5:
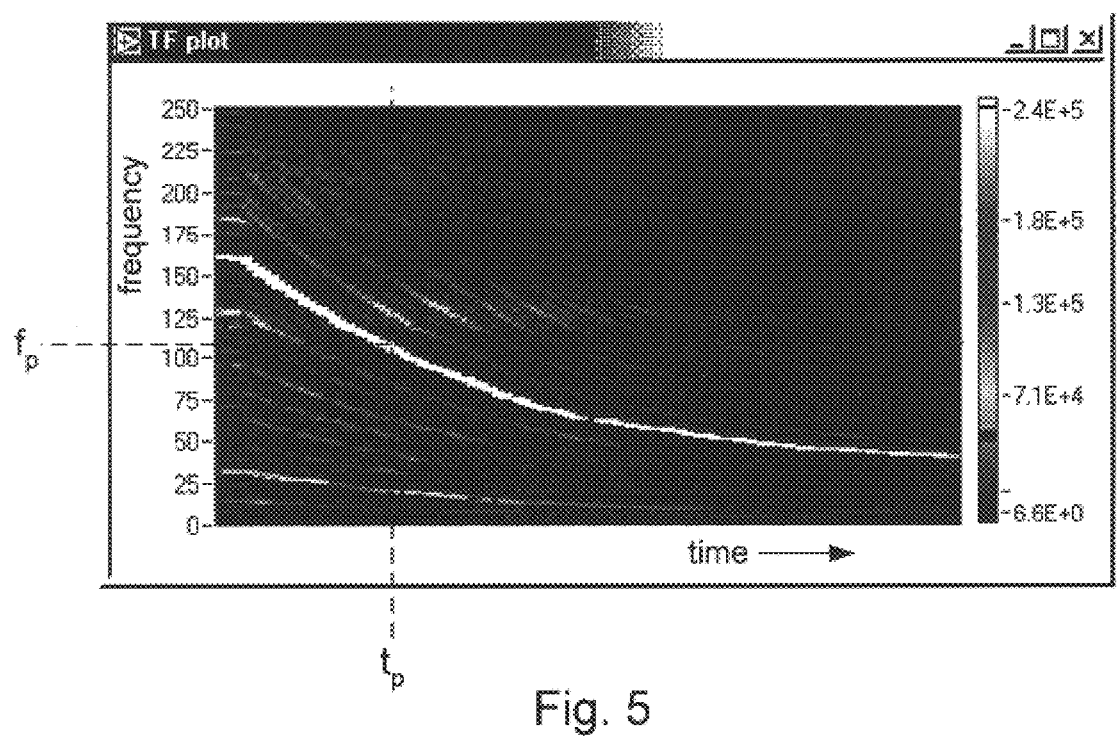
FIG. 5 illustrates a time-frequency transform magnitude plot, i.e., a plot of the magnitude of a joint time-frequency transform for a particular input signal.

FIG. 5 illustrates a magnitude plot of the first array of coefficients generated by a Gabor transform of the original signal X. The horizontal axis denotes time. The vertical axis denotes frequency. Thus, plots such as FIG. 5 are referred to as TF plots (i.e., time-frequency plots). The magnitude of coefficients comprising the first array are denoted by gray scale with full white indicating a maximal magnitude and full black indicating a minimal magnitude (e.g. zero magnitude). It is noted that grey scale may not map to coefficient magnitude in a linear fashion. Non-linear mapping may be more advantageous in certain situations.

Observe that the TF transform magnitude plot of FIG. 5 exhibits a series of curves which are shaped roughly like decaying exponentials. The coefficient magnitudes along a given curve may be larger than magnitudes off the curve (at least in a local neighborhood of the curve). These curves are referred to herein as order curves. An order curve corresponds to a component of the physical signal X which is periodic with respect to rotation angle of the rotating element. For example, in an automobile engine with 6 cylinders, all six cylinders may fire for each rotation of a crank shaft. Thus, one would expect to see a large magnitude curve for order 6. The order curves of FIG. 5 are shaped like decaying exponentials because the underlying rotating element is decreasing in angular velocity. Thus, as time proceeds, the frequency associated with any given order curve decreases. If the rotating element were increasing in angular velocity, the order curves would increase in frequency as a function of time.

In steps 230 and 240, signal analysis system 120 operates to select a subset of coefficients from the first array. In one embodiment, the subset of coefficients may be selected in response to user input. In another embodiment, the subset of coefficients may be selected automatically, i.e., programmatically selected, based on pre-programmed or user-selected identification criteria. The selected subset of coefficients correspond to order components of interest to the user, i.e., order components desired to be analyzed by the user. In general, the subset of coefficients may be determined based on the order components desired to be analyzed.

In step 230, signal analysis system 120 may generate an order mask array which is used in selecting the subset of coefficients. The order mask array may be generated in response to user input through user input device(s) UID, or may be generated automatically by software executing in the signal analysis system 120. The order mask array may comprise an array of coefficients similar in structure to the first array generated by the joint time-frequency transform. Coefficients of the order mask array may take the values one or zero, in order to select a subset of coefficients and mask out other coefficients. Thus the "1" values in the order mask array select the subset of desired coefficients, while the "0" values mask out other non-desired coefficients.

The user may select the desired order components in various ways. In one embodiment, signal analysis system 120 may present a TF transform magnitude plot (such as the plot of FIG. 5) to the user through display device DD. Thus, the user may be able to visually identify which orders have largest magnitude, smallest magnitude, etc. The user may provide an indication of one or more order curves which he/she desires to extract from the ambient signal X through user input device(s) UID. For example, the graphical user interface managed by signal analysis system 120 may provide adjustable cross hairs for the user to indicate desired positions within the displayed TF transform magnitude plot, as shown in FIG. 5. The user may drag vertical and horizontal cross hairs with a pointing device (such as a mouse) until the cross hairs intersect at a point on the desired order curve. In addition (or alternatively), the user may move a screen cursor with a pointing device (such as a mouse, trackball, etc.) until the cursor lies on a point of the desired order curve(s). In response to a user selection event (e.g. clicking on a mouse button), signal analysis system 120 may receive horizontal and vertical coordinates of the selected point. Signal analysis system 120 may compute an order number from the coordinates of the selected point. More details on the order number computation are provided below. In some embodiments, the user may be able to enter an order number (e.g. on a numeric keypad) to select a desired order curve. The order number is typically measured in cycles per rotation. The order having order number one, i.e. one cycle per rotation, is designated as the fundamental order.

Figure 6:
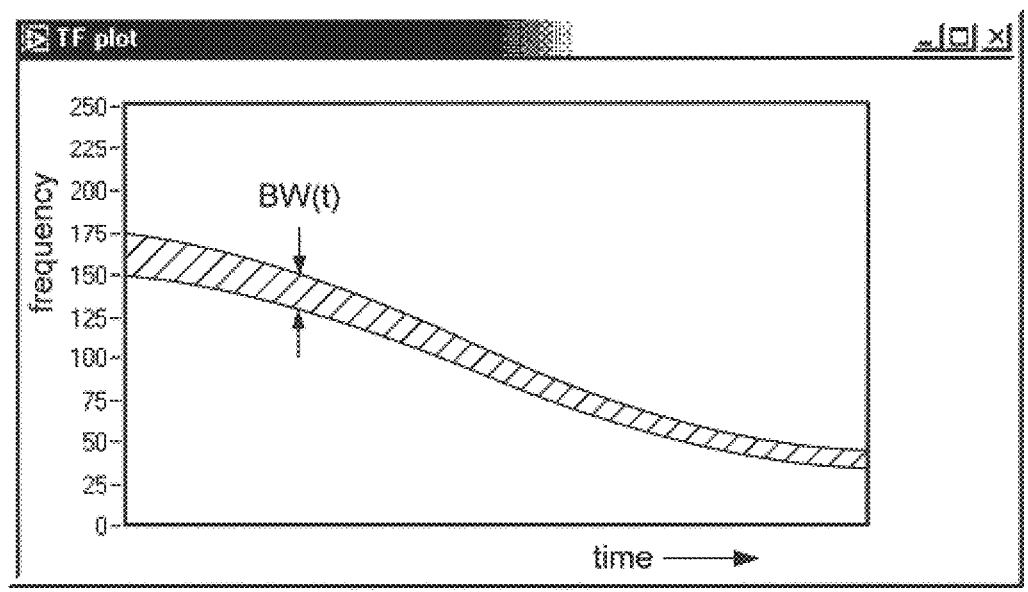
FIG. 6 illustrates the structure of an order mask array configured to retain only one order component of the input signal.

Signal analysis system 120 may generate the mask array so that coefficients in a time-frequency neighborhood of the desired order curve(s) are set to one, and coefficients outside the neighborhood may be set to zero, as suggested by FIG. 6. Signal analysis system 120 may allow the user to adjust properties of the time-frequency neighborhood. For example, the user may be able to control the frequency bandwidth of the time-frequency neighborhood around the desired order curve(s). In one embodiment, signal analysis system 120 may superimpose the boundary of the time-frequency neighborhood on a TF transform magnitude plot displayed to the user through display device DD. Thus, the user may visually observe the time-frequency neighborhood in relation to the desired order curve(s). The frequency bandwidth BW(t) of the neighborhood as a function of time may vary with respect to time. The user may provide inputs which control the frequency bandwidth function BW(t). For example, the user may provide a bandwidth control parameter to signal analysis system 120 through user input device(s) UID. Signal analysis system 120 determines the frequency bandwidth function BW(t) in response to the bandwidth control parameter.

In step 240, signal analysis system 120 may apply the mask array to the first array of coefficients. For example, signal analysis system 120 may multiply the mask array by the first array to generate a subset of coefficients, which may be referred to as a second array of coefficients. Coefficients of the second array may be equal to corresponding coefficients of the first array in the time-frequency neighborhood of the desired order curve(s), and zero otherwise. Thus, the mask array may serve to pick out a particular subset of coefficients from the first array which are desired to be analyzed and to suppress (i.e., eliminate or remove) the coefficients outside the particular subset.

In some embodiments, signal analysis system 120 may generate each coefficient of the second array by conditionally transferring the corresponding coefficient of the first array of transform coefficients in response to logically testing the corresponding value of the mask array. In other words, a processor within signal analysis system 120 may perform operations as indicated by the following pseudo code:

If (Mask(I,J)=1)
    SecondArrayCoeff(I,J)=FirstArrayCoeff(I,J)
Else
    SecondArrayCoeff(I,J)=0.

The indices I and J parameterize the coefficients of the first array, mask array and second array.

In step 250, signal analysis system 120 may generate (i.e., compute) a time domain signal Y from the second array of coefficients, i.e., from the subset of coefficients remaining after the masking operation. Signal analysis system 120 may generate the time domain signal Y by performing an inverse joint time-frequency transform on the second array of coefficients. The inverse joint time-frequency transform may be the inverse of the forward transform applied in step 220. For example, the inverse transform may be the inverse Gabor transform. In an alternate embodiment, where the wavelet transform was used in step 220, the inverse transform may be an inverse wavelet transform.

The time-domain signal Y may represent the behavior in time of the desired order(s) selected by the user. In step 260, signal analysis system 120 transmits the time domain signal Y to signal presentation device(s) SPD for presentation to a user. As described above, signal presentation device(s) SPD may comprise at least one speaker. Thus, signal analysis system 120 may transmit samples of the time domain signal Y to a digital-to-analog converter (DAC). The DAC converts the time domain signal Y into a continuous-time (i.e. analog) signal, and transmits the continuous-time signal to the speaker. The user may listen to the acoustic signal generated by the speaker in response to the continuous-time signal. In addition, signal presentation device(s) SPD may include a visual display (e.g. display device DD, a projection screen, etc.). Thus, signal analysis system 120 may transmit a graphical representation of the time domain signal Y to the visual display. Thus, the user may be able to visually observe the time domain signal Y as well as listen to the acoustic representation of time domain signal Y.

Steps 230, 240 and 250 have been described above in terms of extracting one or more order components from the input signal for presentation to the user. Thus, using the method described above, signal analysis system 120 may be configured to extract one or more order components for presentation to the user.

Where a plurality of order components are selected for analysis (e.g., all order components but one) the order mask may be set to one in the neighborhoods containing the corresponding plurality of desired order curves respectively, and set to zero outside these neighborhoods. The plurality of order curves may be user-selected or automatically selected. As one example, the user may select one or more non-desired order components for masking or removal, and the signal analysis system 120 may be configured to suppress the one or more non-desired order components, and to present to the user the input signal minus the one or more suppressed order components. In this case, the order mask may be set to zero in one or more neighborhoods containing the one or more non-desired order curves selected for removal, and set to one outside these neighborhoods.

In one embodiment of signal analysis system 120, the user may toggle between an order extraction mode and an order suppression mode. In the order extraction mode, order components selected by the user are the desired order components to be analyzed, and the non-selected order components are masked or removed prior to performing the inverse transform in step 250 to generate the time domain signal Y. In the order suppression mode, order components physically selected by the user are masked or removed, thus effectively "selecting" the remaining order components for analysis. Thus, order components may be "selected" either by direct user selection of the desired subset of components by the user, or order components may be "selected" by the user selecting non-members of the desired subset of components for masking or removal.

In some embodiments, signal analysis system 120 may automatically (e.g., programmatically) select one or more order curves for analysis, i.e., select order components without direct user input. Signal analysis system 120 may operate on the first array of coefficients, and automatically detect the fundamental order curve. The fundamental order curve may be detected based on its low frequency and large magnitude. Furthermore, signal analysis system 120 may detect one or more order curves having the certain pre-programmed or user-defined properties such as largest magnitude, smallest magnitude, etc. Signal analysis system 120 may iteratively extract the one or more order curves from the input signal, and present the one or more orders curves to the user through signal presentation device(s) SPD. Alternatively, signal analysis system 120 may subtract (i.e. suppress) the detected one or more order curves from the input signal, and present the remainder signal to the user through signal presentation device(s) SPD.

Figure 7:
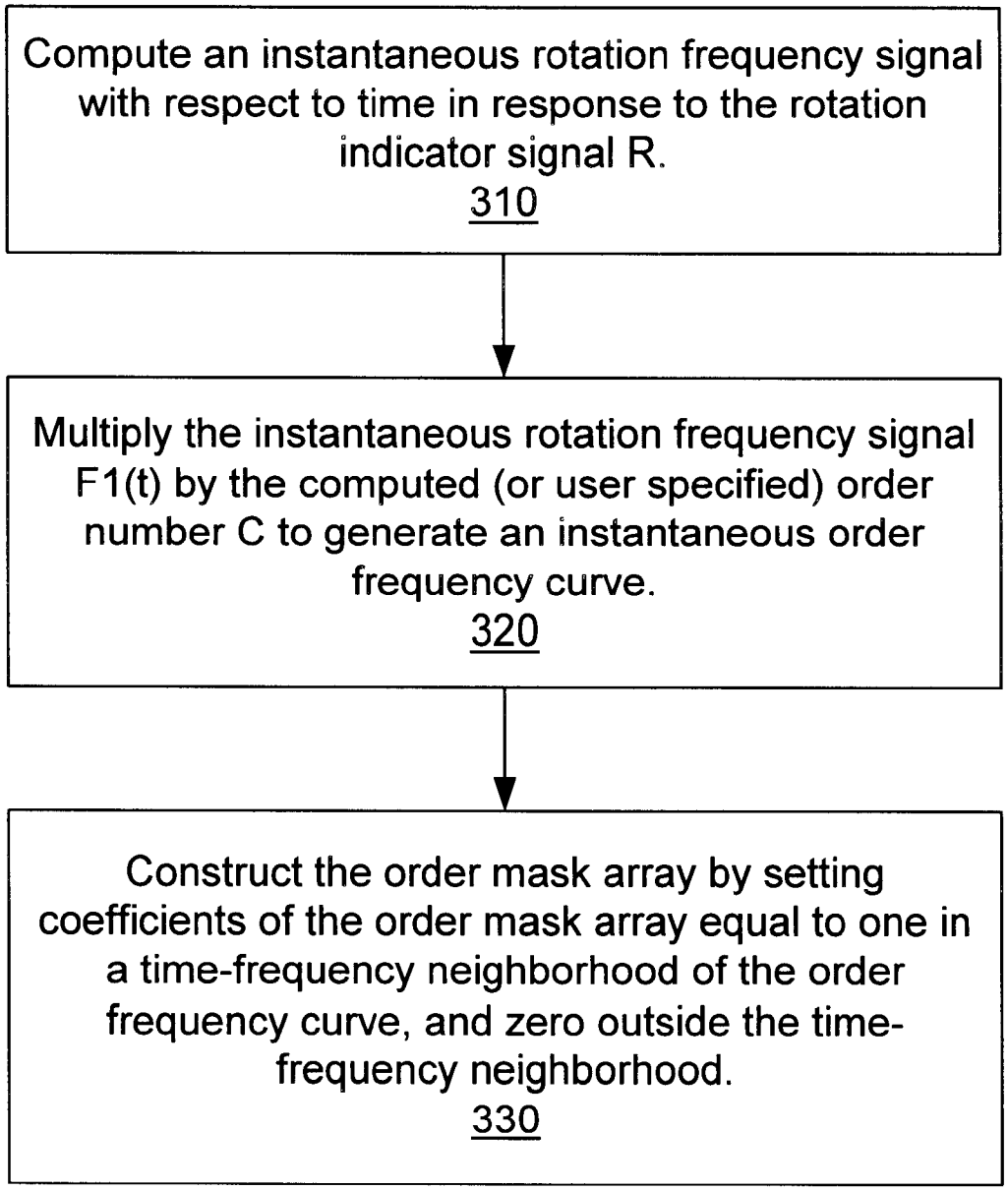
FIG. 7 presents a flowchart for one embodiment of a method for constructing an order mask array in response to a received rotation indicator signal R.

FIG. 7—Construction of the Order Mask Array

In the currently preferred embodiment, signal analysis system 120 constructs the order mask array as indicated by the flowchart of FIG. 7. In step 310, signal analysis system 120 computes an instantaneous rotation frequency signal with respect to time. In one embodiment, the system 120 computes the instantaneous rotation frequency signal in response to the rotation indicator signal R. For example, data acquisition device 104 may comprise circuitry for measuring the time of arrival of pulses in the rotation indicator signal R (e.g. a tachometer signal). In other embodiments, the system 120 estimates the instantaneous rotation frequency signal, or the user estimates the instantaneous rotation frequency signal.

Where the rotation indicator signal R is received and used, signal analysis system 120 may receive a stream of digital values representing the times of arrival TOA(k) of successive pulses P(k) in the rotation indicator signal R. Signal analysis system 120 may compute the time difference $$dTOA(k)=TOA(k)-TOA(k-1)$$

between a current pulse P(k) and a previous pulse P(k-1). This time difference dTOA(k) represents the instantaneous period of rotation of the rotating element within physical system 110. The instantaneous rotation frequency at time TOA(k) corresponds to the inverse 1/dTOA(k) of the instantaneous period signal. In one embodiment, it is assumed that the instantaneous rotation frequency given by 1/dTOA(k) corresponds to the midpoint time $$\frac{TOA(k) + TOA(k-1)}{2}$$

between successive times of arrival. A variety of time-assignment schemes are contemplated. Furthermore, it is noted that signal analysis system 210 may estimate the inverse of time difference dTOA(k) by table look up with interpolation instead of by direct division.

Figure 8:
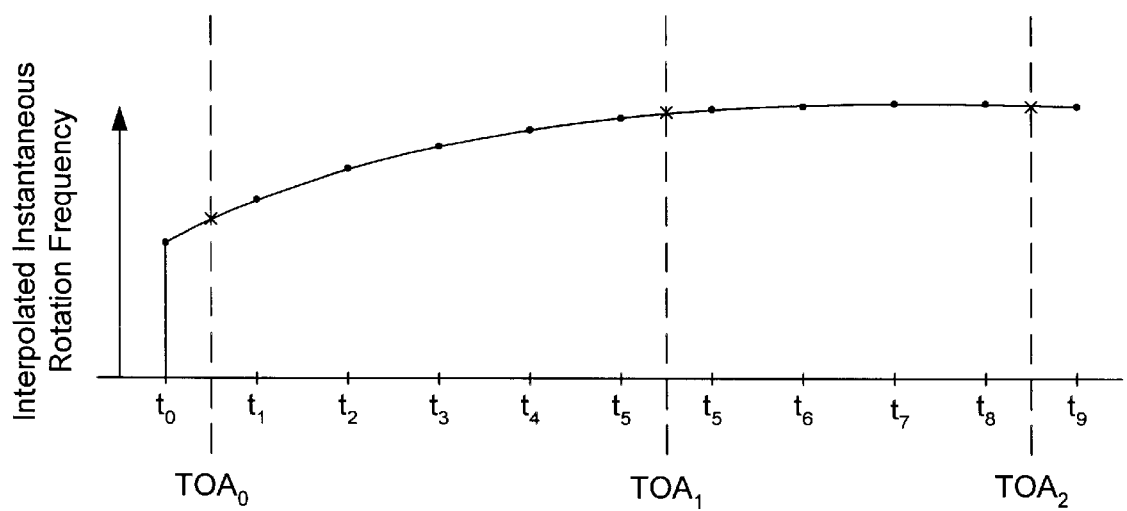
FIG. 8 illustrates the interpolation of samples of the instantaneous rotation frequency signal at sample times $t_j$ based on the instantaneous rotation frequency values at the times of arrival TOA(k) of pulses in the rotation indicator signal R (e.g. a tachometer signal)

An analog-to-digital converter (e.g. one situated within data acquisition device 104) may digitize the transduced physical signal X. Let $t_j$ denote the sampling times for the samples $X(t_j)$ of the transduced physical signal X. Because multiple sample times $t_j$ may occur between successive times of arrival TOA(k), signal analysis system 120 may interpolate samples of the instantaneous rotation frequency signal at sample times $t_j$ based on the instantaneous rotation frequency values at the times of arrival TOA(k) as suggested in FIG. 8. FIG. 8 illustrates three successive times of arrival, i.e. TOA(0), TOA(1) and TOA(2), and nine successive sample times $t_1$ through $t_9$. Signal analysis system 120 may apply any of a variety of interpolation and/or filtering algorithms to interpolate the instantaneous rotation frequency at each of the sample times $t_j$ based on the instantaneous rotation frequency at the times of arrival TOA(k). The interpolated frequency values are denoted with small dots. The instantaneous frequency value at each time of arrival is denoted with a small "x". The interpolation results in an instantaneous rotation frequency signal $F_1(t_j)$ defined at each sampling time $t_j$.

Estimation of the Instantaneous Rotation Frequency Signal Without Rotation Speed Information In various alternate embodiments, the signal analysis system 120 estimates the instantaneous rotation frequency signal $F_1(t)$ without receiving any rotation speed information, i.e., without use of rotation sensing device RSD and rotation indicator signal R.

In one alternative embodiment, the signal analysis system 120 estimates the instantaneous rotation frequency signal $F_1(t)$ from transform data, i.e. from the first array of transform coefficients. For example, signal analysis system 120 may scan the first array of coefficients for a time-frequency curve with sufficient coefficient magnitude with the property that none of its integer submultiples have sufficient coefficient magnitude. The magnitude which is considered sufficient may depend on a user supplied threshold parameter. In this alternative embodiment, system configuration 100 may not require a rotation sensing device RSD, since signal analysis system 120 may be configured to compute an instantaneous rotation frequency signal $F_1(t)$ without use of rotation indicator signal R. By definition of order number, instantaneous rotation frequency signal $F_1(t)$ defines the order curve of order one (i.e. one cycle per rotation).

In a second alternative embodiment, signal analysis system 120 allows the user to identify the order curve of order one. For example, the user may select a point of the order curve he/she believes to be the curve of order one. Signal analysis system 120 may apply an search algorithm which walks along the "top of the magnitude ridge" in order to determine the locus of the order one curve from the selected point. Again, since the user identifies the order curve of order one, the rotation sensing device RSD and rotation indicator signal R may not be necessary.

As noted above, the instantaneous rotation frequency signal $F_1(t_j)$ tracks the order curve of order one. Furthermore, an order curve of order C is determined by the corresponding multiple of the instantaneous rotation frequency signal, i.e. $C^*F_1(t_j)$. The order number C is a positive real number.

As described above, signal analysis system 210 may receive user input specifying a desired order curve. For example, the user may select a point on a desired order curve in a displayed TF transform magnitude plot (as shown in FIG. 5). The coordinates (e.g. the horizontal and vertical pixel coordinates) of the selected point may be used to compute a corresponding time-frequency pair $(t_p, f_p)$ for the selected point. Signal analysis system 120 may evaluate (estimate or interpolate) an instantaneous rotation frequency value $F_1(t_p)$ appropriate for time $t_p$, and divide frequency $f_p$ by the evaluated instantaneous rotation frequency $F_1(t_p)$ in order to determine the order number of the desired order curve. In other words, the order number C of the desired order curve equals $f_p/F_1(t_p)$. In some embodiments, the user may enter the order number C of the desired order curve directly, and thus the computation of the order number C based on a selected point may not be necessary.

In step 320, signal analysis system 120 multiplies the instantaneous rotation frequency signal $F_1(t)$ by the computed order number C to generate an instantaneous order frequency curve $F_C(t)=C^*F_1(t)$.

Figure 9:
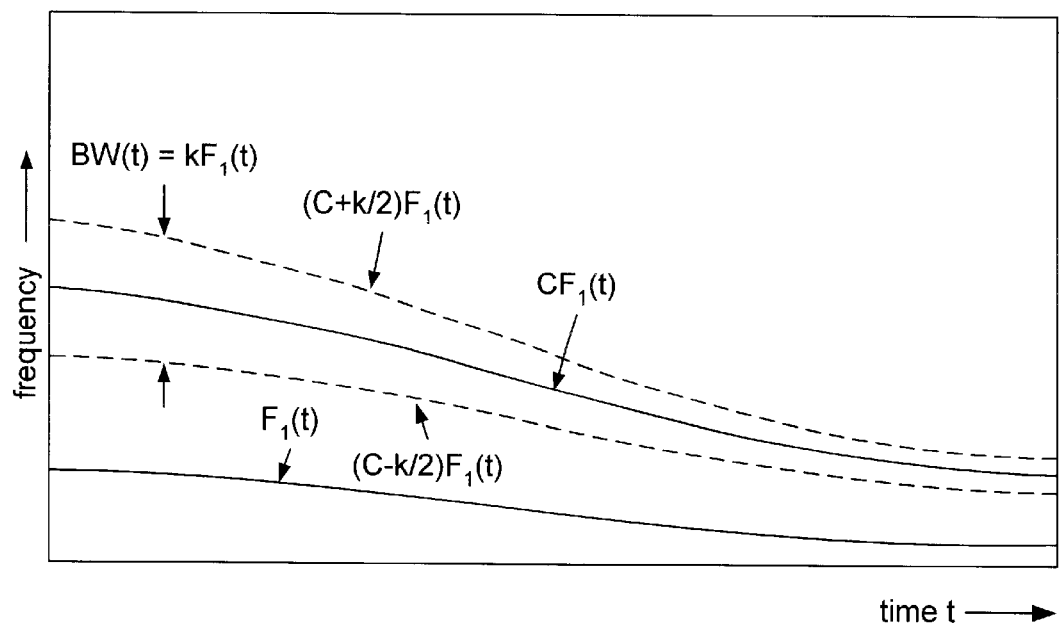
FIG. 9 illustrates one possible realization for a time-frequency neighborhood containing a time-frequency curve corresponding to order number C used in the generation of the order mask array.

In step 330, signal analysis system 120 constructs the order mask array by setting coefficients Coeff(t,f) of the order mask array equal to one in a time-frequency neighborhood of the order frequency curve $F_o(t)$, and zero outside the time-frequency neighborhood. For example, the time-frequency neighborhood may be defined as the time-frequency region between the curves $(C+k/2)^*F_1(t)$ and $(C-k/2)^*F_1(t)$ as shown in FIG. 9. While the frequency bandwidth $BW(t)=k^*F_1(t)$ varies in time, the order bandwidth k is constant. The order bandwidth k may be defined by user input. In alternative embodiments, the order bandwidth may be itself a function of time, i.e. k=k(t).

As described above, signal analysis system 120 computes a joint time-frequency transform of the original input signal X. The transform function K(t,f) depends on time and frequency. Thus, it is natural to plot the magnitude of transform function K(t,f) as a function of time and frequency as shown in FIG. 5. However, to further reveal the order structure of the input signal X, it may be advantageous to plot magnitude of the transform as a function of time and order. Thus, signal analysis system 120 may compute coefficients for a function L(t,N) of time and order N according to the relation $$L(t,N)=K(t,N^*F_1(t)).$$

Figure 10:
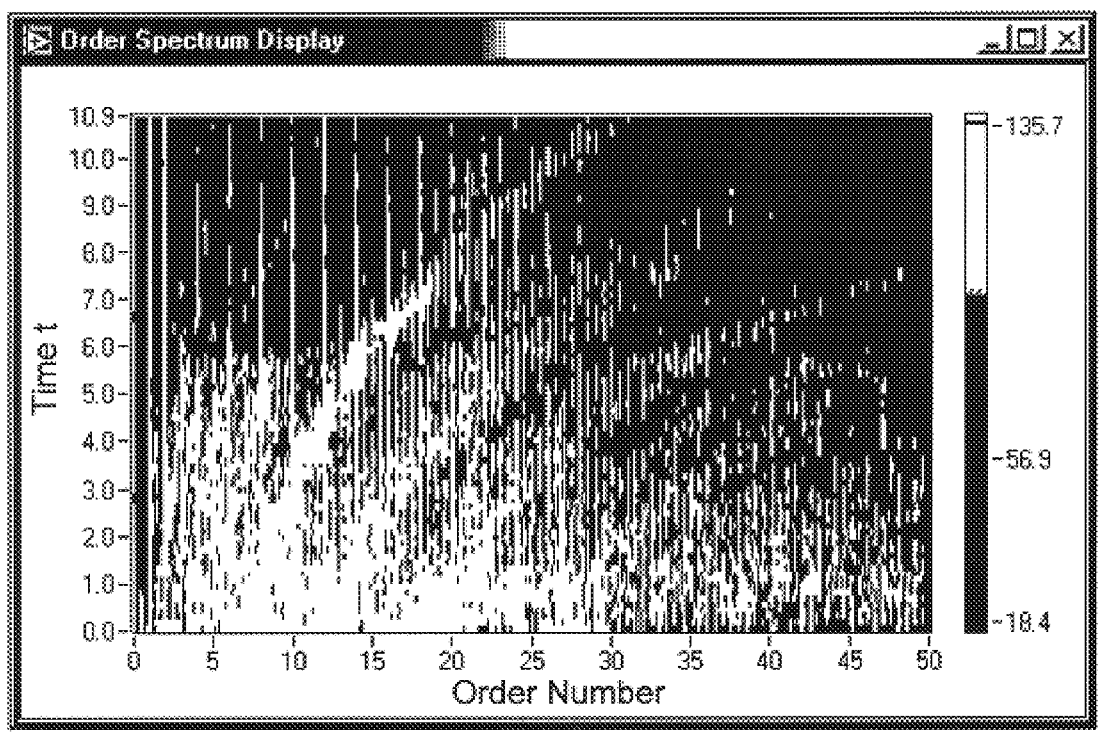
FIG. 10 presents a time-order transform magnitude plot for the same signal as depicted in FIG. 5.

In other words, each line of constant time at time t in the time-frequency plot may be contracted in frequency by a factor equal to the corresponding instantaneous rotation frequency $F_1(t)$. Order N may equal any rational number. Signal analysis system 120 may display the magnitude of time-order transform function L(t,N) as a function of time and order as shown in FIG. 10. Magnitude may be indicated by gray scale or by color along a color continuum. Because order number is the horizontal parameter in FIG. 10, order curves appear as vertical lines.

The user may be able to visually identify which orders are have largest magnitude, smallest magnitude, etc. by observing the time-order transform magnitude display (as shown in FIG. 10). The user may provide an indication of an order curve which he/she desires to extract from the ambient signal X through user input device(s) UID. For example, the graphical user interface managed by signal analysis system 120 may provide adjustable cross hairs for the user to indicate desired positions within the displayed time-order transform magnitude display. The user may drag vertical and horizontal cross hairs with a pointing device (such as a mouse) until the cross hairs intersect at a point on the desired order curve. In addition (or alternatively), the user may move a screen cursor with a cursor control device (such as a mouse, trackball, etc.) until the cursor lies on a point of the desired order curve. In response to a user selection event (e.g. clicking on a mouse button), signal analysis system 120 may receive horizontal and/or vertical coordinates of the selected point on the time-order plot. Signal analysis system 120 may compute an order number from the coordinate(s) of the selected point. In some embodiments, the user may be able to enter an order number (e.g. on a numeric keypad) to select a desired order curve.

As described above, signal analysis system 120 may be configured to extract a desired order component (i.e. order curves) from the original signal X. In one embodiment, signal analysis system 120 may be configured to extract as many order components as desired from the original signal X. For example, the user may select points on one or more order curves in a time-frequency (and/or time-order) transform magnitude plot. Signal analysis system 120 may:

(a) construct an order mask which takes the value one in a time-frequency neighborhood of each of the selected (desired) order curves, and zero outside the union of these neighborhoods;

(b) mask the first array of transform coefficient with the order mask, thereby generating a second array of coefficients;

(c) apply an inverse joint time-frequency transform (e.g. inverse Gabor transform) to the second array of coefficients, thus generating a time-domain signal containing the desired order components;

(d) present the time-domain signal to the user through signal presentation device(s) SPD.

Figure 11A:
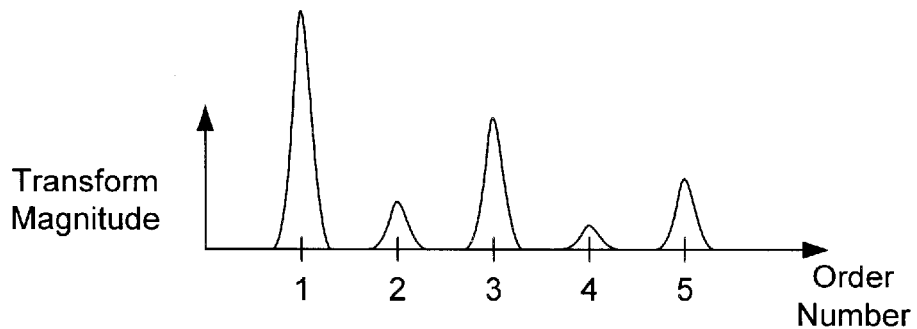
FIGS. 11A–E illustrate various embodiments of signal analysis system 120 in which one or more order components of the input signal X may be extracted from the input signal or suppressed in the input signal.

In FIG. 11A, a single time-slice of a time-order transform magnitude plot is displayed.

Figure 11B:
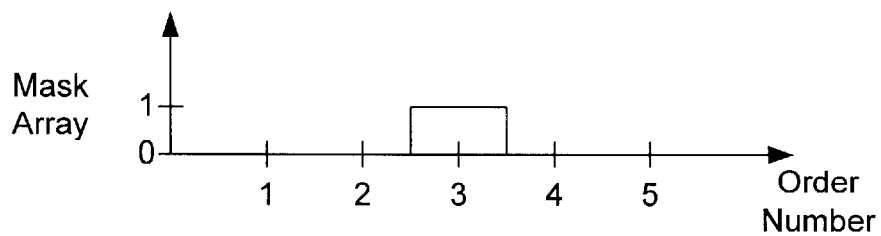

FIG. 11B illustrates an order mask generated by signal analysis system 120 in response to the user's selection of a single order component with order number equal to three. Signal analysis system 120 may mask the first array of transform coefficients with the order mask indicated in FIG. 11B, and thus generate a second array of coefficients corresponding to only the third order component. The second array may be inverse transformed to generate samples of a time-domain signal. The time-domain signal comprises the third order component of the original signal X. This time-domain signal may be presented to the user through signal presentation device(s) SPD (e.g. a display and/or speaker).

Figure 11C:
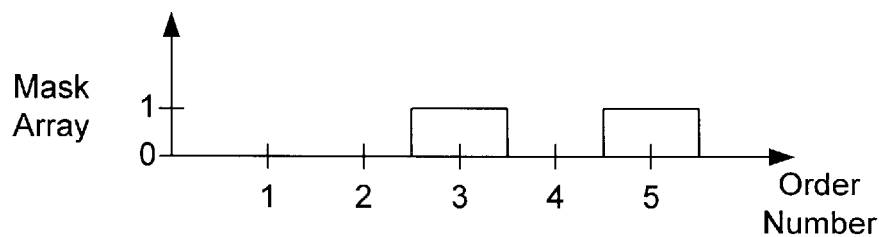

FIG. 11C illustrates an order mask generated by signal analysis system 120 in response to the user's selection of two order components with order numbers three and five respectively. Signal analysis system 120 may mask the first array of transform coefficients with the order mask indicated in FIG. 11C, and thus, generate a second array of coefficients corresponding to the third and fifth order components. The second array may be inverse transformed to generate samples of a time-domain signal. The time-domain signal comprises the third and fifth order components of the original signal X. This time-domain signal may be presented to the user through signal presentation device(s) SPD (e.g. a display and/or speaker).

As noted above, the user may provide input indicating order components desired to be masked or removed, thereby effectively selecting the remaining components for analysis. Thus, the user may provide an indication of one or more order curves which he/she desires to suppress (i.e. subtract) from the original signal X. The graphical user interface managed by signal analysis system 120 may allow the user to graphically select one or more points of the one or more order curves which he/she desires to suppress from the original signal X. Signal analysis system 120 may compute order numbers from the coordinates of the selected points. In one embodiment, the user may be able to enter one or more order numbers (e.g. on a numeric keypad) to select desired order curves. In response to the computed (or entered) one or more order numbers, signal analysis system 120 may:

(a) construct an order mask which takes the value zero in a time-frequency neighborhood of each of the user selected (user selected for removal) or non-desired order curves, and one outside the union of these neighborhoods;

(b) mask the first array of transform coefficient with the order mask, thereby generating a second array of coefficients;

(c) apply an inverse joint time-frequency transform (e.g. inverse Gabor transform) to the second array of coefficients, thus generating a time-domain signal which corresponds to the original signal X minus the specified order components;

(d) present the time-domain signal to the user through signal presentation device(s) SPD.

Figure 11D:
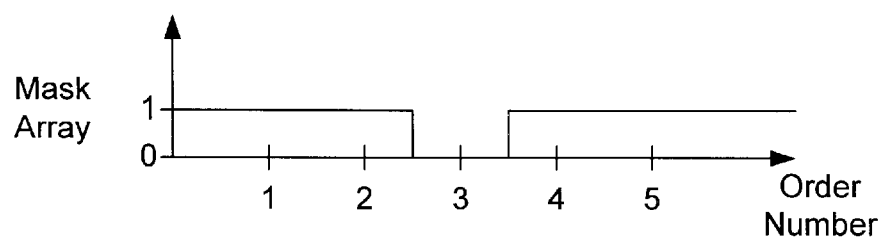

FIG. 11D illustrates an order mask generated by signal analysis system 120 in response to the user's selection of a single order component with order number equal to three for suppression from the original signal X. The order mask takes the value zero in a neighborhood of order number three and one outside this neighborhood. Signal analysis system 120 may mask the first array of transform coefficients with the order mask indicated in FIG. 11D, and thus, generate a second array of coefficients corresponding to the original signal X minus only the third order component. The second array may be inverse transformed to generate samples of a time-domain signal. The time-domain signal represents the original signal minus (i.e. without) the third order component. This time-domain signal may be presented to the user through signal presentation device(s) SPD (e.g. a display and/or speaker).

Figure 11E:
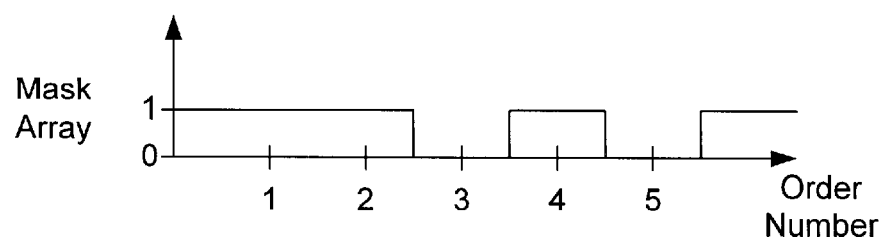

FIG. 11E illustrates an order mask generated by signal analysis system 120 in response to the user's selection of two order components with order numbers three and five respectively for suppression from the original signal X. The mask array takes the value zero in neighborhoods of order three and five, and the value one outside these neighborhoods. Signal analysis system 120 may mask the first array of transform coefficients with the order mask indicated in FIG. 11E, and thus, generate a second array of coefficients corresponding to the original signal X minus the third and fifth order components. The second array may be inverse transformed to generate samples of a time-domain signal. The time-domain signal represents the original signal minus (i.e. without) the third and fifth order components. This time-domain signal may be presented to the user through signal presentation device(s) SPD (e.g. a display and/or speaker).

As noted above, signal analysis system 120 is configured to extract or suppress any desired number of order components from the original signal X. The graphical user interface maintained by signal analysis system 120 allows the user to select order curves and/or order numbers, and to select per order curve (and/or per order number) whether the order curve is to be extracted or suppressed.

The present invention contemplates automated methods for selecting order components for extraction or suppression (i.e., programmatic selection of order components). For example, signal analysis system 120 may determine one or more order components having largest magnitudes, and may automatically extract these order components and suppress the remaining order components. Signal analysis system 120 may be programmed by a user to search for order components having any desired set of properties, and to extract (i.e. to pass to the output) or suppress the discovered order components.

Scaling Function

In some embodiments, signal analysis system 120 may be configured to apply a scaling function to the first array of transform coefficients instead of (or in addition to) applying a binary-valued order mask as described above. The scaling function may serve to emphasize or de-emphasize selected order components. Signal analysis system 120 generates the scale array in response to user inputs, and multiplies the scale array by the first array of transform coefficients, thus generating a third array of coefficients. The third array of coefficients is inverse transformed. The resulting time-domain signal Y is presented to the user graphically and/or acoustically (i.e. through a display and/or a speaker).

Figure 12A:
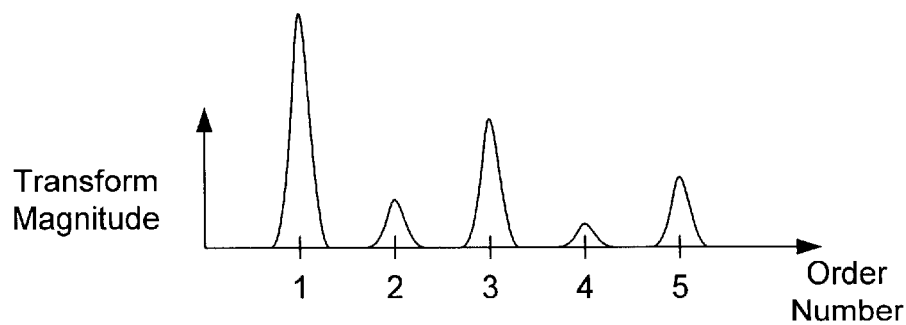
FIGS. 12A–E illustrate various embodiments of signal analysis system 120 in which one or more order components of the input signal X may be emphasized or de-emphasized by multiplying transform coefficients by a scaling function.
Figure 12B:
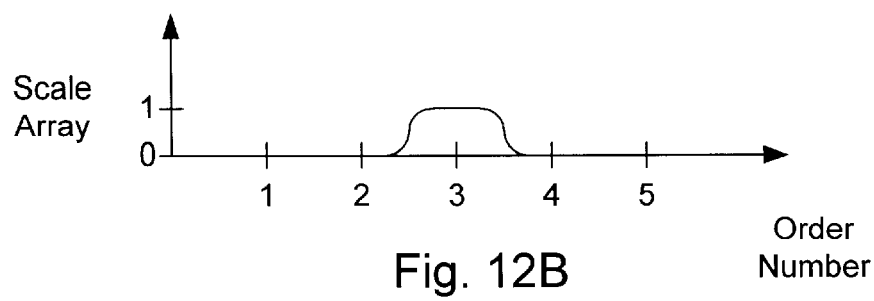
Figure 12C:
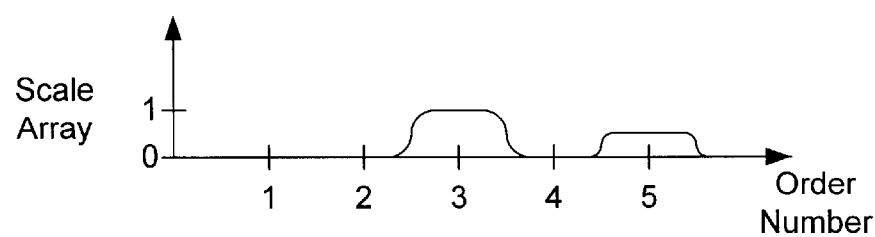
Figure 12D:
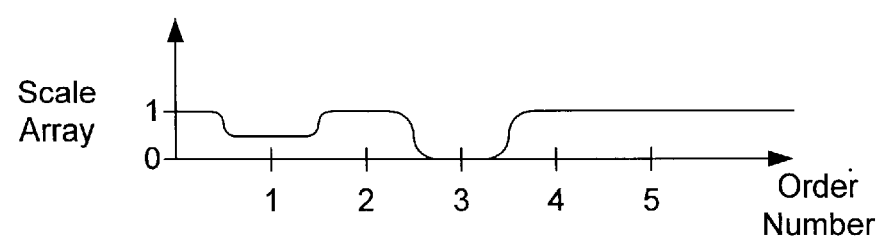
Figure 12E:
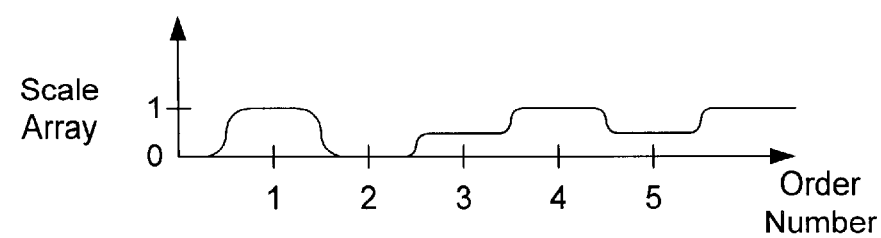

For example, FIG. 12A illustrates a transform magnitude plot of a signal at a single time-slice, and FIGS. 12B–E illustrate several of a variety of possible scale arrays (i.e. scaling functions). In FIG. 12B, a scale array is configured to extract order component three and to suppress all other order components. The scale array may have smooth transitions between band pass regions and band reject regions. In FIG. 12C, a scale array is configured to pass order component three, to attenuate order component five by a factor of ½ and to reject all other order components. In FIG. 12D, a scale array is configured to reject order component three, to attenuate order component one, and to pass all other orders. In FIG. 12E, a scale array is configured to pass order components one, four and above five, to attenuate order components three and five, and to reject order component two and order components below one. Arbitrary scaling arrays are contemplated. The user may specify the properties of a scaling array to achieve any desired effect on one or more order components of the original signal X. For example, the user may specify an order curve (e.g. by selecting a point on the order curve), and assign a scaling value to the order curve, i.e. a real number value which determines by how much the order curve is to be amplified and/or attenuated. The scaling value may be entered in terms of decibels, or any other convenient set of units.

While the above examples have illustrated masking and/or scaling of order components having integer order numbers, it is understood that masking and/or scaling of order components having non-integer order numbers may be performed just as easily.

Engine Noise Example

The following is an example of the operation of one embodiment of the present invention in an automobile engine application. Consider a situation where a user desires to reduce the engine noise in the engine of an automobile. In this case, the user may arrange one or more microphones proximate to the engine and acquire signals from these microphones. The user may then iteratively select various order components of the acquired signals to analyze or listen to in order to determine what components of the acquired signals contribute most to the engine noise. Alternatively, the user may iteratively select various order components of the acquired signals to mask out or remove from the input signal, and then listen to the input signal minus these components. Thus the user may be able to determine what components of the acquired signals contribute most to the engine noise. The user may then adjust the engine in various ways, such as changing the design of the engine, replacing one or more components of the mechanical system, predicting a failure of one or more components of the mechanical system, and/or adding a sound-absorbent material to one or more locations of the mechanical system to reduce the engine noise.

Analyzing Multiple Order Component Families from an Acquired Signal

In one embodiment, the system and method is operable to analyze multiple order component families from an acquired signal. For example, an acquired signal may contain information from two or more independent signal sources or two or more different rotating elements, e.g., two or more different engines. The order components associated or originating from a respective source, such as a respective rotating element, may be referred to as an "order family". In this instance, each order family may be responsive to the rotation rate of the corresponding rotating element. These respective order families may be analyzed independently using the methods described above. For example, the user may visually distinguish order components from these different order families in a visual representation of the time-frequency coefficients (the first array of coefficients) and the user may select different order components from these order families for analysis. In one embodiment, the signal analysis system may acquire a rotation indication signal for each rotating element, and compute corresponding instantaneous rotation frequency signals for each rotating element. The order components in each order family may be multiples of the corresponding fundamental order as determined from the corresponding instantaneous rotation frequency signal.

Although the system and method of the present invention is described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. A method for analyzing an input signal acquired from a mechanical system containing a rotating apparatus, the method comprising:

receiving samples of the input signal, wherein the input signal is sampled in time;

performing an invertible joint time-frequency transform on the samples of the input signal to produce a first array of coefficients which depend on time and frequency;

selecting first coefficients from the first array which correspond to a first subset of one or more order components in the input signal;

generating a time domain signal from the first coefficients; and presenting the time domain signal to a user on a presentation device, wherein the time domain signal is useable in analyzing the mechanical system; and adjusting the mechanical system in response to analysis of the time domain signal, wherein said adjusting the mechanical system comprises one or more of: 1) changing a design of the mechanical system; 2) replacing one or more components of the mechanical system; 3) predicting a failure of one or more components of the mechanical system; and 4) adding a sound-absorbent material to one or more locations of the mechanical system.

2. The method of claim 1, wherein said generating the time domain signal from the first coefficients comprises performing an inverse joint time-frequency transform on the first coefficients.

3. The method of claim 1, further comprising selecting the first subset of one or more order components prior to said selecting the first coefficients from the first array.

4. The method of claim 3, wherein said selecting the first subset of one or more order components comprises selecting a second subset of one or more order components in the input signal for removal, wherein the first subset of one or more order components corresponds to order components of the input signal which are not included in the second subset of one or more order components.

5. The method of claim 1, wherein the input signal comprises a plurality of order components, the method further comprising:

displaying a visual representation of the first array of coefficients, wherein the visual representation indicates at least one of the plurality of order components;

receiving user input which indicates a user's selection of one or more points in the visual representation, wherein said user input operates to select the first coefficients from the first array.

6. The method of claim 5, further comprising determining one or more time-frequency curves corresponding to the one or more points, wherein the one or more time-frequency curves are used to determine the first coefficients from the first array.

7. The method of claim 6, wherein said selecting the first coefficients from the first array comprises selecting coefficients of the first array which correspond to the one or more time-frequency curves;

wherein the one or more time-frequency curves correspond to the first subset of one or more order components in the input signal.

8. The method of claim 7, wherein said selecting the first coefficients from the first array comprises selecting coefficients of the first array which reside in a union of neighborhoods containing the one or more time-frequency curves respectively.

9. The method of claim 6, wherein said selecting the first coefficients from the first array comprises selecting coefficients of the first array which do not correspond to the one or more time-frequency curves.

10. The method of claim 9, wherein said selecting the first coefficients from the first array comprises selecting coefficients of the first array which reside in the complement of the union of neighborhoods containing the one or more time-frequency curves respectively.

11. The method of claim 1, wherein said selecting the first coefficients from the first array comprises:

constructing an order mask array which corresponds to the first subset of one or more order components;

applying the order mask array to the first array of coefficients to select the first coefficients.

12. The method of claim 11, the method further comprising:

determining one or more time-frequency curves which corresponding to the one or more order components of the first subset;

wherein said constructing the order mask array further comprises setting coefficients of the order mask array equal to one in a union of neighborhoods containing the one or more time-frequency curves of the first subset respectively.

13. The method of claim 11, further comprising:

determining one or more time-frequency curves which corresponding to a second subset of one or more order components in the input signal;

wherein said constructing the order mask array further comprises setting coefficients of the order mask array equal to zero in a union of neighborhoods containing the one or more time-frequency curves of the second subset respectively, wherein the first subset of order components comprises order components of the input signal which are not included in the second subset.

14. The method of claim 11, wherein said constructing the order mask comprises:

computing an instantaneous rotation frequency signal with respect to time, wherein the instantaneous rotation frequency signal corresponds to a fundamental order component of the input signal;

wherein the order mask array is constructed using one or more multiples of the instantaneous rotation frequency signal.

15. The method of claim 11, wherein said constructing the order mask further comprises:

receiving a first signal indicative of speed of rotations of the rotating apparatus;

wherein the instantaneous rotation frequency signal is computed in response to the first signal.

16. The method of claim 14, further comprising:

generating an instantaneous order frequency signal as a multiple of the instantaneous rotation frequency signal in response to a desired order number;

wherein said constructing the order mask array further comprises setting coefficients of the order mask array equal to a first value in a first neighborhood of the instantaneous order frequency signal.

17. The method of claim 1, wherein said presentation device comprises at least one speaker;

wherein said presenting the time domain signal to the user on the presentation device comprises audially presenting the time domain signal as sound output from the at least one speaker.

18. The method of claim 1, wherein said presentation device comprises a display;

wherein said presenting the time domain signal to the user on the presentation device comprises visually displaying the time domain signal on the display.

19. The method of claim 1, wherein the samples of the input signal are equally space in time.

20. The method of claim 1, wherein the joint time-frequency transform comprises the Gabor transform.

21. The method of claim 1, wherein the input signal comprises a signal generated by a microphone proximate to the mechanical system.

22. The method of claim 1, wherein the input signal comprises an accelerometer signal generated by an accelerometer coupled to the mechanical system.

23. A method for analyzing an input signal acquired from a mechanical system containing a rotating apparatus, the method comprising:
   receiving samples of the input signal, wherein the input signal is sampled in time;
   performing an invertible joint time-frequency transform on the samples of the input signal to produce a first array of coefficients which depend on time and frequency;
   selecting one or more order components in the input signal, wherein said selecting the one or more order components in the input signal comprises:
      receiving a first signal indicative of speed of rotations of the rotating apparatus;
      computing an instantaneous rotation frequency signal with respect to time in response to the first signal, wherein the instantaneous rotation frequency signal corresponds to a fundamental order component of the input signal;
      generating one or more multiples of the instantaneous rotation frequency signal, wherein each of said one or more order components corresponds to one of said multiples;
   selecting a first subset of coefficients from the first array in response to said selection of the one or more order components in the input signal;
   generating a time domain signal from the first subset of coefficients; and
   presenting the time domain signal to a user on a presentation device;
   wherein the time domain signal is useable in analyzing the mechanical system.

24. The method of claim 23, wherein said generating the time domain signal from the first subset of coefficients comprises performing an inverse joint time-frequency transform on the subset of coefficients.

25. The method of claim 23, wherein said selecting the first subset of coefficients from the first array comprises selecting coefficients of the first array which correspond to the one or more order components.

26. The method of claim 23,
   wherein said selecting one or more order components in the input signal comprises selecting the one or more order components for removal;
   wherein said selecting the first subset of coefficients from the first array comprises selecting coefficients of the first array which correspond to the input signal with the one or more order components removed.

27. The method of claim 23, wherein said selecting the one or more order components is performed in response to user input.

28. The method of claim 23, wherein said selecting the one or more order components includes determining one or more time-frequency curves corresponding to the one or more order components.

29. A method for analyzing one or more order components from a input signal generated by a mechanical system containing a rotating apparatus, the method comprising:
   receiving samples of the input signal;
   performing an invertible joint time-frequency transform on the samples of the input signal to produce a first array of coefficients which depend on time and frequency;
   constructing an order mask array in response to user input;
   masking the first array of coefficients with the order mask array to generate a second array of coefficients which depend on time and frequency;
   generating a time domain signal from the second array of coefficients;
   presenting the time domain signal to a user on a presentation device;
   wherein the time domain signal is useable in analyzing the mechanical system.

30. The method of claim 29, wherein said constructing an order mask comprises:
   computing an instantaneous rotation frequency signal with respect to time;
   multiplying the instantaneous rotation frequency signal by one or more order numbers to generate one or more instantaneous order frequency signals;
   generating a third array of coefficients, wherein coefficients of the third array equal a first value in one or more time-frequency neighborhoods of the one or more instantaneous order frequency signals, wherein the order mask comprises the third array, wherein the coefficients of the third array equal a second value outside the one or more time-frequency neighborhoods.

31. The method of claim 30, wherein the first value equals one and the second value equals zero.

32. The method of claim 30, wherein the first value equals zero and the second value equals one.

33. The method of claim 30, wherein said constructing the order mask further comprises:
   receiving a first signal indicative of speed of rotations of the rotating apparatus;
   wherein the instantaneous rotation frequency signal is computed in response to the first signal.

34. The method of claim 33, wherein the first signal comprises a tachometer signal generated by a tachometer coupled to the mechanical system.

35. The method of claim 30, wherein the one or more time-frequency neighborhoods have frequency bandwidths controlled by a second user input.

36. The method of claim 30, further comprising computing the one or more order numbers in response to the user input.

37. The method of claim 36, wherein said computing the one or more order numbers in response to the user input comprises:
   displaying a visual representation of the first array of coefficients on a display screen;
   receiving location data in response to one or more user selection event specifying one or more locations on the display screen;
   computing one or more time-frequency pairs in response to the location data;
   dividing the frequency of each time-frequency pair by a value of the instantaneous rotation frequency signal corresponding to the time of the time-frequency pair.

38. The method of claim 36, wherein said computing the one or more order numbers in response to the user input comprises:
   rescaling the first array of coefficients to generate a fourth array of coefficients, wherein the rescaled fourth array of coefficients depend on order and time;
   displaying a visual representation of the fourth array of coefficients on a display screen;

receiving location data in response to one or more user selection events specifying one or more locations on the display screen.

39. A method for analyzing one or more order components from a first signal generated by a mechanical system containing a rotating apparatus, the method comprising:

receiving samples of the first signal;

performing a forward joint time-frequency transform on the first signal to produce a first array of coefficients which depend on time and frequency, wherein the forward joint-time frequency transform is invertible;

constructing a scaling array in response to user input;

scaling the first array of coefficients by the scaling array to generate a second array of coefficients;

generating a time domain signal from the second array of coefficients;

presenting the time domain signal to a user on a presentation device;

wherein the time domain signal is useable in analyzing the mechanical system.

40. The method of claim 39, wherein said scaling emphasizes one or more order components in the first signal, wherein said constructing the scaling array is performed in response to the user input.

41. The method of claim 40, wherein said scaling de-emphasizes one or more order components in the first signal, wherein said constructing the scaling array is performed in response to user input.

42. A system for analyzing operation of a rotating apparatus in a mechanical system, the system comprising:

an input for receiving samples of the input signal, wherein the input signal is acquired from the mechanical system containing the rotating apparatus, wherein the input signal is sampled in time;

a processor coupled to the input;

a memory medium coupled to the processor which stores analysis software;

wherein the processor is operable to execute the analysis software to:

perform an invertible joint time-frequency transform on the input signal to produce a first array of coefficients which depend on time and frequency;

select a first subset of coefficients from the first array which correspond to a first subset of one or more order components, wherein, in selecting the first coefficients from the first array, the processor is operable to:

construct an order mask array which corresponds to the first subset of one or more order components; and apply the order mask array to the first array of coefficients to select the first coefficients; and generate a time domain signal from the subset of coefficients; and a presentation device coupled to the processor which is operable to present the time domain signal to a user;

wherein the time domain signal is useable in analyzing operation of the rotating apparatus in the mechanical system.

43. The system of claim 42, wherein, in generating the time domain signal, the processor is operable to perform an inverse joint time-frequency transform on the first subset of coefficients.

44. The system of claim 42, further comprising an input device coupled to the processor, wherein the input device is operable to receive user input selecting the first subset of one or more order components, wherein the first subset of one or more order components indicate the first subset of coefficients from the first array.

45. The system of claim 42, further comprising an input device coupled to the processor, wherein the input device is operable to receive user input selecting a second subset of one or more order components in the input signal for removal, wherein the first subset of one or more order components corresponds to order components of the input signal which are not included in the second subset of one or more order components.

46. The system of claim 42, wherein the input signal comprises a plurality of order components, the system further comprising:

a display which displays a visual representation of the first array of coefficients, wherein the visual representation indicates at least one of the a plurality of order components;

an input device operable to receive user input which indicates a user's selection of one or more points in the visual representation, wherein said user input operates to select the first coefficients from the first array.

47. A memory medium comprising program instructions for analyzing an input signal acquired from a mechanical system containing a rotating apparatus, wherein the program instructions are executable to implement:

receiving samples of the input signal, wherein the input signal is sampled in time;

performing an invertible joint time-frequency transform on the input signal to produce a first array of coefficients which depend on time and frequency;

masking the first array of coefficients with the order mask array to generate a second array of coefficients which depend on time and frequency;

generating a time domain signal from the second array of coefficients; and presenting the time domain signal to a user on a presentation device;

wherein the time domain signal is useable in analyzing the mechanical system.

* * * * *